United States Patent

Benatav

[11] Patent Number: 6,076,365
[45] Date of Patent: Jun. 20, 2000

[54] VALVE ASSEMBLY AND AIRCONDITIONING SYSTEM INCLUDING SAME

[75] Inventor: Dror Benatav, Tel Aviv, Israel

[73] Assignee: Ben-Ro Industry and Development Ltd., Mobile Post Mercaz, Israel

[21] Appl. No.: 09/096,563

[22] Filed: Jun. 12, 1998

[30] Foreign Application Priority Data

Sep. 17, 1997 [IL] Israel ................................. 121794
Feb. 4, 1998 [IL] Israel ................................. 123184

[51] Int. Cl.⁷ ........................................... F25B 13/00
[52] U.S. Cl. .................... 62/160; 62/196.4; 62/324.6; 137/625.43
[58] Field of Search ................... 62/81, 277, 278, 62/196.4, 272, 324.1, 324.5, 324.6, 151, 160, 159, 150; 137/625.43, 625.29; 251/38

[56] References Cited

U.S. PATENT DOCUMENTS

| | | |
|---|---|---|
| 2,743,739 | 5/1956 | Mansen . |
| 2,855,000 | 10/1958 | Van Allen et al. . |
| 2,857,929 | 10/1958 | Whitlock, Jr. . |
| 2,947,324 | 8/1960 | Cooper et al. . |
| 2,976,701 | 3/1961 | Greenawalt . |
| 3,037,525 | 6/1962 | Wiegers . |
| 3,142,313 | 7/1964 | Plumettaz . |
| 3,369,790 | 2/1968 | McHale et al. . |
| 3,395,839 | 8/1968 | Vercillo . |
| 3,448,959 | 6/1969 | McHale et al. . |
| 3,745,780 | 7/1973 | Leonard, Jr. . |
| 3,985,154 | 10/1976 | Hargraves . |
| 4,112,974 | 9/1978 | Davis et al. . |
| 4,139,355 | 2/1979 | Turner et al. . |
| 4,212,324 | 7/1980 | Bauer . |
| 4,240,266 | 12/1980 | Scrine et al. ............... 62/196.4 |
| 4,311,020 | 1/1982 | Tobin et al. . |
| 4,564,045 | 1/1986 | Koch et al. . |
| 4,573,497 | 3/1986 | White . |
| 4,644,973 | 2/1987 | Itoh et al. . |
| 4,712,582 | 12/1987 | Marks . |
| 4,753,271 | 6/1988 | Fornasari . |
| 4,760,709 | 8/1988 | Aoki et al. ............... 62/324.6 |
| 4,825,908 | 5/1989 | Tsuchihashi et al. . |
| 5,265,438 | 11/1993 | Knowles et al. . |
| 5,462,085 | 10/1995 | Iwata et al. . |
| 5,507,315 | 4/1996 | Parker . |
| 5,690,144 | 11/1997 | Takahashi . |

FOREIGN PATENT DOCUMENTS 0 702 176 A1   3/1996   European Pat. Off. .

*Primary Examiner*—Harry B. Tanner
*Attorney, Agent, or Firm*—Darby & Darby

[57] ABSTRACT

A valve assembly for controlling the flow of a fluid between a plurality of ports including at least one high pressure port and one low pressure port, includes: a base mounting the plurality of ports; and a valve member rotatable to a selected operational position with respect to the base. The control face of the valve member is formed with a low pressure cavity in the central region, and with an annular high pressure cavity in the outer region completely circumscribing the low pressure cavity. Such an arrangement produces a balanced valve construction which permits the valve member to be selectively rotated to the selected operational position, or to any intermediate position, while substantially isolating the high pressure from the low pressure in all its positions. This permits the valve assembly to be used not only as conventional change-over valve in an air conditioning system to select either a heating mode or cooling mode of operation, but also as a control valve to perform one or more additional control functions, e.g. for temperature or output control purposes, in any operational positions of the valve member.

52 Claims, 16 Drawing Sheets

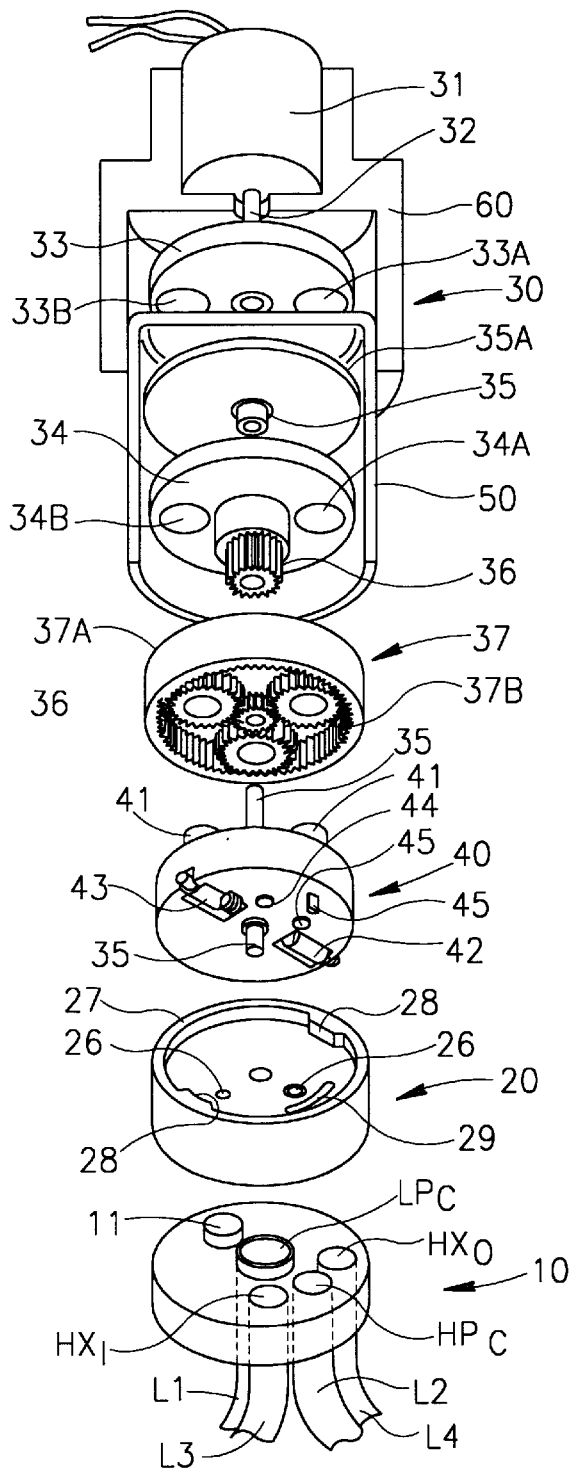
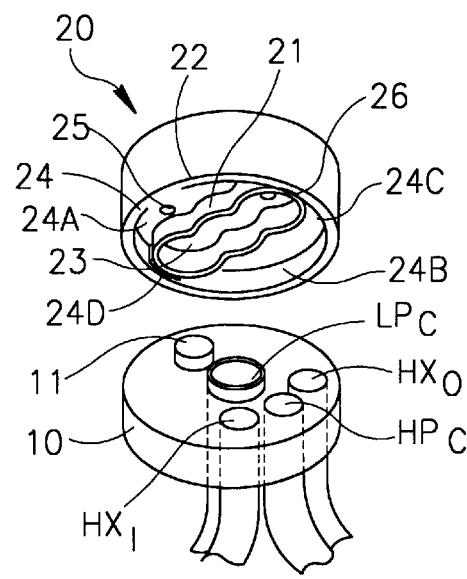
FIG.1
FIG.2

FIG. 6a - COOLING
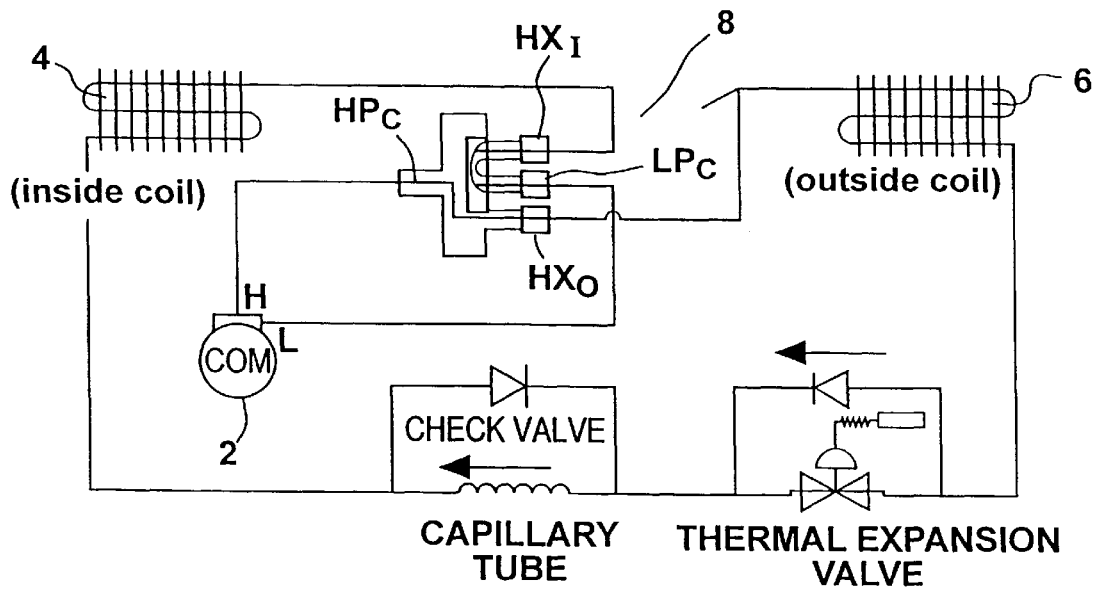
FIG. 6b - HEATING
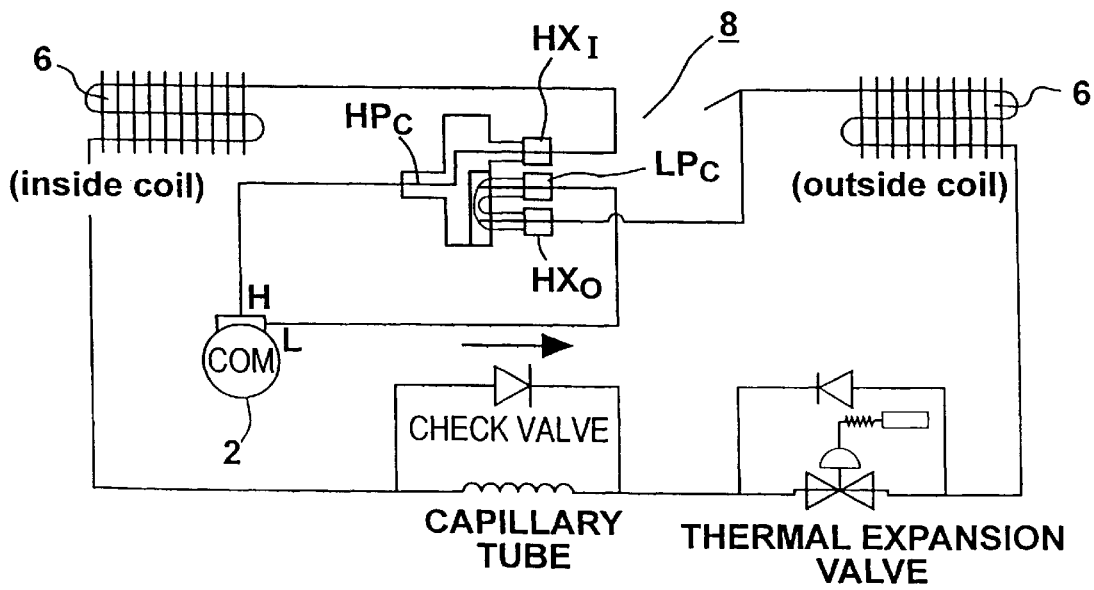

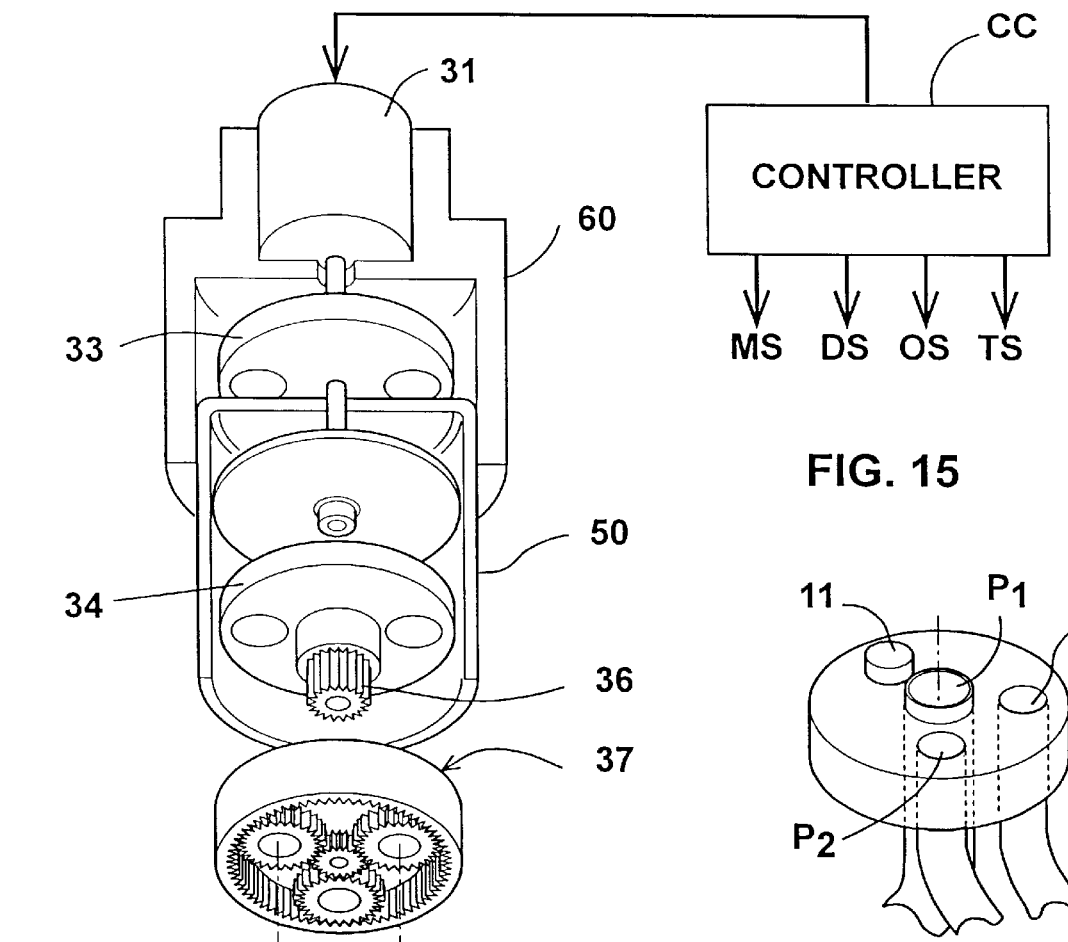
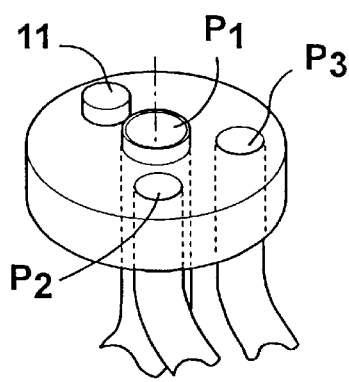
FIG. 15
FIG. 13
FIG. 14

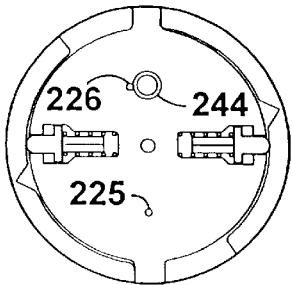
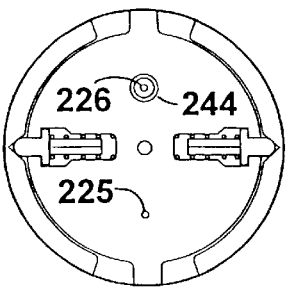
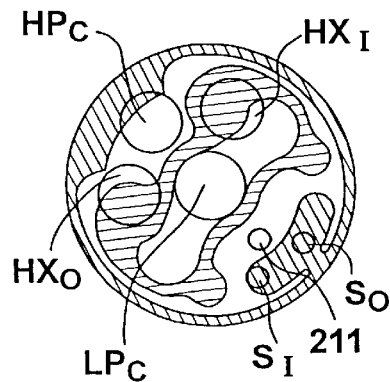
FIG. 22b       FIG. 22a       FIG. 22
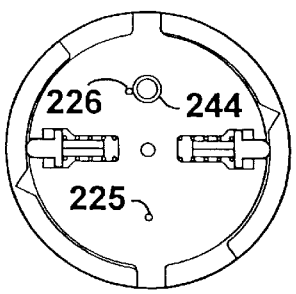
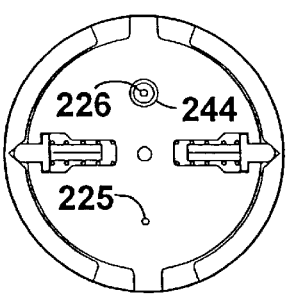
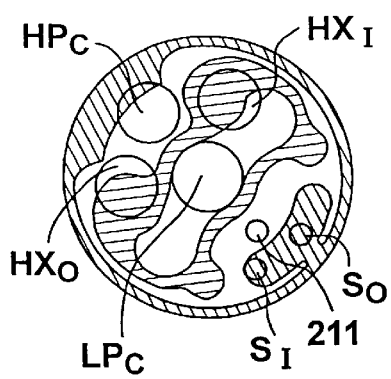
FIG. 23b       FIG. 23a       FIG. 23
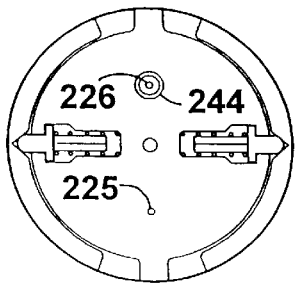
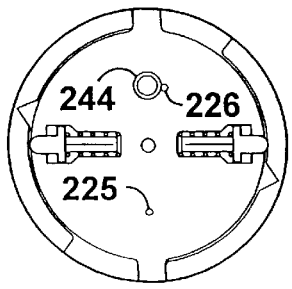
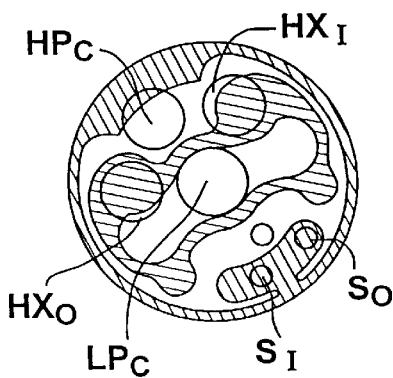
FIG. 24b       FIG. 24a       FIG. 24

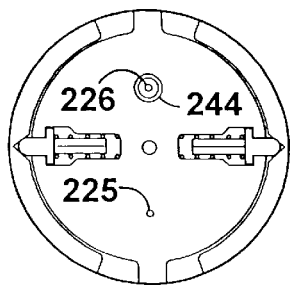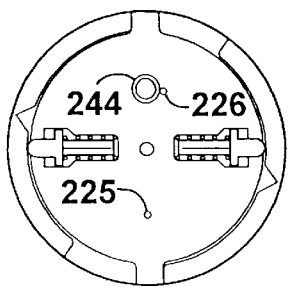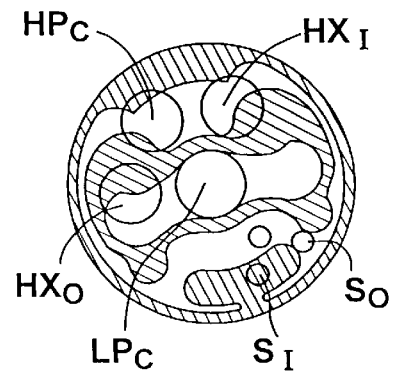
FIG. 25b    FIG. 25a    FIG. 25
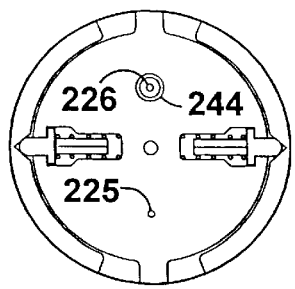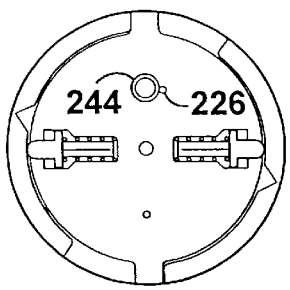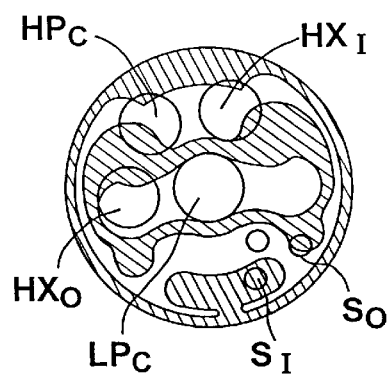
FIG. 26b    FIG. 26a    FIG. 26
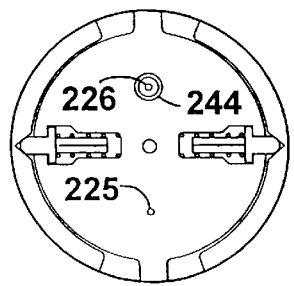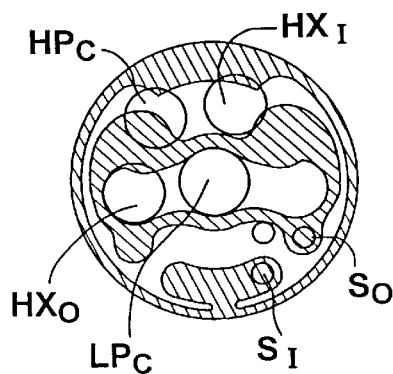
FIG. 27a    FIG. 27

VALVE ASSEMBLY AND AIRCONDITIONING SYSTEM INCLUDING SAME

FIELD OF THE INVENTION

The present invention relates to valve assemblies for controlling the flow of a fluid between a plurality of ports. The invention is particularly useful as a four-way change-over valve assembly in an air conditioning system, and method, for selectively operating the system according to a cooling mode or a heating mode, and is therefor described below particularly with respect to that application, but it will be appreciated that the invention and features thereof could also advantageously be used in many other applications.

BACKGROUND OF THE INVENTION

Four-way change-over valves presently used in air conditioning systems have to accommodate very large pressure differentials, in the order of 30 atmospheres or more. Such high pressure differentials make it difficult to assure that the valve will not leak in its high pressure section, while at the same time to permit change-over from one operating condition to another by the use of a relatively small amount of force. Van Allen U.S. Pat. No. 2,855,000 addresses this problem in a simple manually-operated change-over valve providing only a simple change-over operation. Other four-way change-over valves hereto developed have been of a relatively complicated and expensive construction, as shown for example in U.S. Pat. Nos. 5,462,085 and 5,507,315.

Existing air-conditioning systems are also subject to a number of other problems. One problem is frosting or icing, which can occur when the system is operated in the heating mode (during the winter) or in the cooling mode (during the summer). Should frosting occur in the heating mode, the usual remedy is to change-over to the cooling mode in order to heat the outside coil, and also to shut-off the fan. As a result, considerable energy is lost, and the heating time and the heating capacity are reduced. Should frosting occur in the cooling mode, the usual remedy is to shut-off the compressor and/or to stop or change the speed of the fan, which thereby also involves a loss of energy, time, and cooling capacity. Moreover, interrupting the operation of the compressor is unhealthy to the compressor and requires waiting several minutes before its operation can be resumed. Further, to prevent frosting in the cooling mode, the system is generally designed to operate the evaporator at a temperature significantly above freezing, e.g. about 7° C., to accommodate changes in the outside temperature; this also reduces the efficiency and cooling capacity of the system as compared, for example, when operating at a temperature closer to 0° C.

Another problem involved in present air-conditioning systems is in reducing the cooling or heating capacity of the system, e.g. when the volume of the enclosed space to be cooled or heated is significantly reduced as by shutting off rooms, etc. The present air-conditioning systems are generally merely turned-off in order to reduce the cooling or heating capacity. However, this manner of reducing the capacity also reduces the overall efficiency of the system and wastes energy. Moreover, frequent interruption of the system tends to reduce the useful life of the compressor and the fan.

OBJECTS AND SUMMARY OF THE INVENTION

An object of the present invention is to provide an improved valve assembly which can accommodate large pressure differentials without leakage, which can be actuated from one operating condition to another by the use of a relatively small amount of force, and which can provide other controls, particularly with respect to temperature and/or output. Another object of the present invention is to an air conditioning method and system including a valve assembly which may be used not only as a normal change-over valve for changing-over the operation of the system from cooling to heating and vice versa, but which also may be used as a control valve for performing many control functions within each operational mode, including preventing frosting, defrosting, reducing system capacity when required, etc., in a more efficient manner than in the present air-conditioning systems.

According to one aspect of the present invention, there is provided a valve assembly for controlling the flow of a fluid between a plurality of ports including at least one high pressure port and one low pressure port, comprising: a base mounting the plurality of ports; and a valve member rotatable to a plurality of operational positions with respect to the base. The valve member has a control face facing the base to control the flow of fluid between the ports according to the position of the valve member with respect to the base, and an opposite face facing away from the base. The control face of the valve member is formed with a low pressure cavity in the central region thereof, and with an annular high pressure cavity in the outer region thereof completely circumscribing the low pressure cavity.

According to further features in the described preferred embodiments, the valve assembly further comprises a slow-acting vent for applying high pressure from the high pressure cavity to the opposite face of the valve member, when the valve member is in an operational position, to firmly press the valve member into sealing contact with the base, and thereby to isolate the high pressure cavity from the low pressure cavity; a pilot valve which is normally closed but selectively openable to release the high pressure applied to the opposite face of the valve member, and thereby to enable the valve member to be moved to another operational position; and a passageway from the annular high pressure section of the valve member to the opposite face of the valve member to maintain the control face of the valve member sufficiently close to the base to substantially isolate the high pressure cavity from the low pressure cavity also when the pilot valve is open and is moved to another operational position. The latter isolation is not complete because of a thin air cushion produced by the high pressure cavity between the base and valve member completely around the valve member, but is sufficient to permit the valve also to be used as a control valve to perform a number of control functions, particularly for temperature control and/or output control purposes.

As will be described below, a valve assembly constructed in accordance with the foregoing features provides a high degree of protection against leakage from its high pressure section when the valve assembly is in an operating condition, permits the valve to be changed-over to another operating condition by the application of a relatively small amount of force, and further permits the valve, to be used to perform a number of important control functions when in either operating position. The valve assembly can therefore be constructed in a simple, inexpensive and compact form, as compared to previous constructions, and is particularly useful in air-conditioning systems to be operated according to a cooling mode in the summer and a heating mode in the winter.

According to another aspect of the present invention, therefore, there is provided an air-conditioning system for air-conditioning an enclosed space by compressing and expanding a fluid, comprising: an inside heat exchanger to be located within the enclosed space; an outside heat exchanger to be located outside the enclosed space; a compressor having a low pressure side and a high pressure side; and a change-over valve. The change-over valve includes: a base having a low pressure port connected to the low pressure side of the compressor, and a high pressure port connected to the high pressure side of the compressor; a valve member rotatable with respect to the base; a rotary motor drive for driving the valve member; and a controller for controlling the rotary motor drive to selectively drive the valve member; (a) to a first position connecting the low pressure port to the inside heat exchanger and the high pressure port to the outside heat exchanger to define a low pressure section including the inside heat exchanger for using the fluid to cool the enclosed space; (b) to a second position connecting the high pressure port to the inside heat exchanger, and the low pressure port to the outside heat exchanger, to the outside heat exchanger, to the define a high pressure section including the inside heat exchanger for using the fluid to heat the enclosed space. The controller also controls the rotary motor drive for selectively driving the valve member to at least one further position, in addition to and preferably between the first and second positions. The valve member is constructed to maintain the high pressure section substantially isolated from the low pressure section, and to perform at least one additional control function, when the valve is driven to the further position.

One described additional function is to shunt a part of the fluid from the high pressure port to the low pressure port to thereby control temperature within the system without interrupting the compressor. Another described additional function is to restrict the effective cross-sectional area of the low pressure port with respect to the heat-exchanger connected to it, to thereby control the output of the system without interrupting the operation of the compressor. A further control function is to selectively open and close the pilot valve, not only for making a change-over operation, but also for controlling leakage from the high pressure port to the low pressure port for temperature control purpose in any position of the valve.

Such an air-conditioning system can therefore be operated to perform many diverse control functions, including preventing frosting or overheating, reducing system capacity, etc., in a continuous, periodic, when-required manner. This permits the air-conditioning to be designed for maximum efficiency and to be continuously controlled according to changing conditions.

According to a still further aspect of the present invention, there is provided a method of air-conditioning an enclosed space providing the advantages described above.

Further features and advantages of the invention will be apparent from the description below.

BRIEF DESCRIPTION OF THE DRAWINGS

The invention is herein described, by way of example only, with reference to the accompanying drawings, wherein:

FIG. 1 is an exploded 3-dimensional view illustrating a preferred form of valve assembly constructed in accordance with the present invention;

FIG. 2 is an exploded 3-dimensional view illustrating only the base-mounted ports and the opposite side of the valve member from that shown in FIG. 1;

FIGS. 6a and 6b illustrate an air conditioning system including the valve assembly of FIG. 1, with the valve member in the cooling mode position and heating mode position, respectively, of FIGS. 4a and 5b;

FIGS. 13 and 14 illustrate two further applications of the valve assembly of the present invention;

FIG. 15 is an exploded three-dimensional view illustrating another preferred form of valve assembly constructed in accordance with the present invention;

FIGS. 20–23 diagrammatically illustrate the valve assembly in its cooling mode but at different positions to control a pair of shunting lines for temperature control purposes;

FIGS. 20a, 20b–23a, 23b illustrate two optional controls of the pilot valve in each of the valve positions illustrated in FIGS. 20–23 respectively; and FIGS. 24–27 and 24a–27a are views corresponding to FIGS. 19–23b but showing the valve member in its heating mode position.

DETAILED DESCRIPTION OF THE ILLUSTRATED EMBODIMENTS

Figure 3:
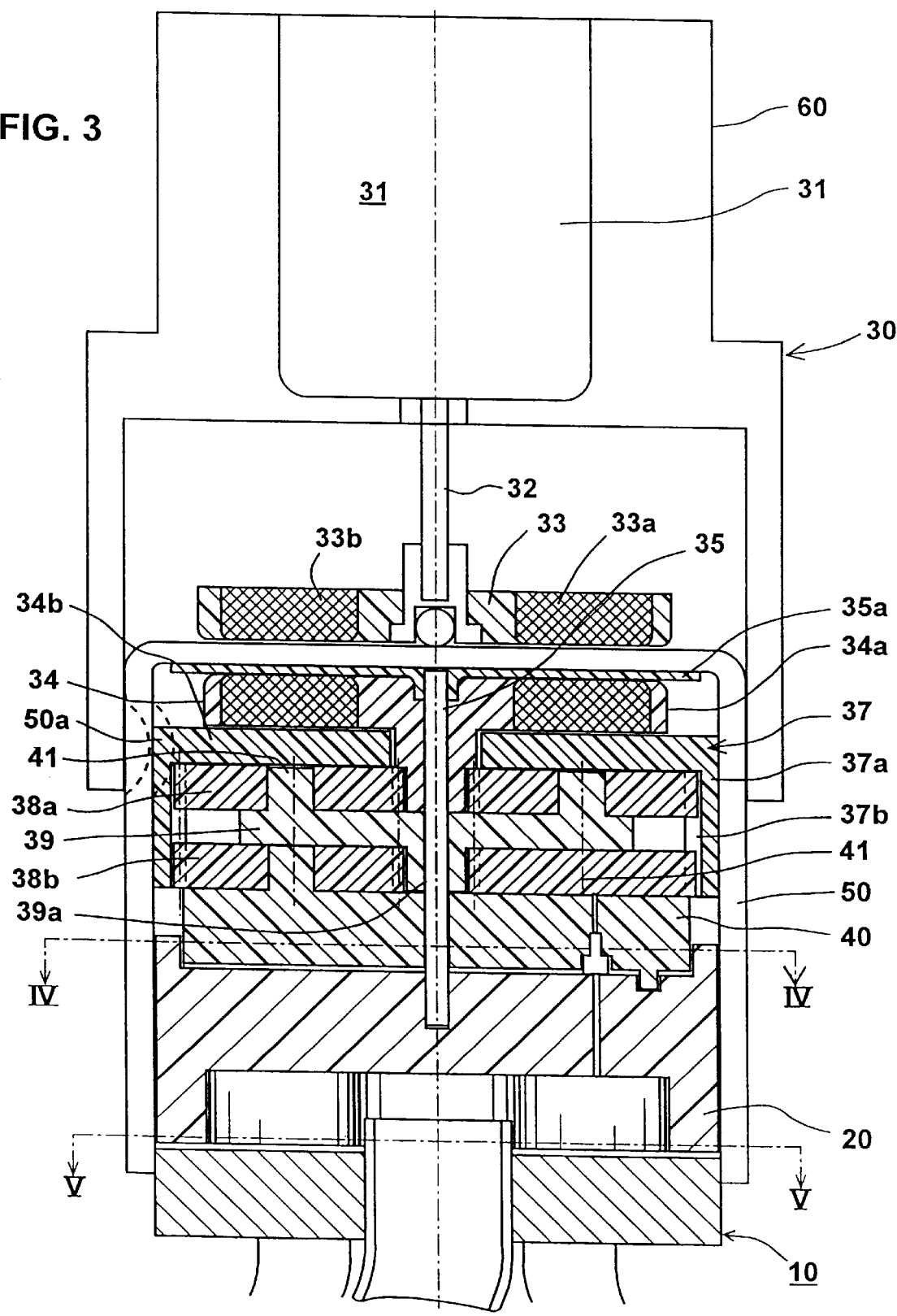
FIG. 3 is a sectional view of the valve assembly of FIG. 1 in assembled condition.

The valve assembly illustrated in FIGS. 1–6b serves both as a four-way change-over valve for an air conditioning system, to operate the system according to either a cooling mode or a heating mode, and also as a control valve for performing any one of a number of control functions in either mode. The air conditioning system, as diagramatically illustrated in FIGS. 6a and 6b, includes a compressor 2; an inside heat-exchanger or coil 4 (acting as an evaporator in the cooling mode); an outside heat-exchanger or coil 6 (acting as a condenser in the cooling mode), and a valve assembly 8, having a low pressure port $LP_C$ connected to the inlet of the compressor 2, and a high-pressure port $HP_C$ connected to the outlet of the compressor 2. The valve assembly 8 has two further ports $HX_I$, and $HX_O$ to be connected to ports $LP_C$ and $HP_C$ according to the specific mode of operation of the air conditioning system. Thus, FIG. 6a illustrates the cooling mode of operation, wherein port $HX_I$ connects the low pressure from port $LP_C$ to the inside heat-exchanger 4, and port $HX_O$ connects the high pressure from port $HP_C$ to the outside heat-exchanger 6; whereas FIG. 6b illustrates the heating mode of operation wherein port $HX_I$ connects the low pressure from port $LP_C$ to the outside heat-exchanger 6, and port $HX_1$ connects the high pressure from port $HP_C$ to the inside heat-exchanger 4.

The construction of valve assembly 8 is more particularly illustrated in FIGS. 1–3. It includes a base 10 mounting the four ports $LP_C$, $HP_C$, $HX_I$, $HX_O$, which ports are connected by lines $L_1$–$L_4$, respectively, to the compressor 2, inside heat exchanger 4, and outside heat-exchanger 6. Valve assembly 8 further includes a valve member, generally designated 20, which is rotatable to two operational positions to control the flow of the gas between the four ports to produce the cooling and heating modes of operation. Valve member 20 is rotated to its two operational positions by a drive, generally designated 30, and a coupling member or disk, generally designated 40.

Valve member 20, coupling disk 40, and a part of the drive 30, are all enclosed within a housing 50, which is hermetically sealed to the base 10. The remaining elements of the drive 30 are enclosed within a second housing 60 secured to the upper end of housing 50.

The base 10, which forms the bottom wall of housing 50, includes a plurality of holes defining the four ports. Port $LP_C$, connected by line $L_1$ to the low pressure inlet of compressor 2 (FIGS. 6a, 6b), is of the largest cross-sectional area, and is located centrally of base 10. Port $HP_C$, connected by line $L_2$ to the high pressure outlet of compressor 2, is located adjacent to the outer periphery of base 10. Port $HX_I$ connected by line $L_3$ to the inside heat-exchange 4, and port $HX_O$ connected by line $L_4$ to the outside heat-exchanger 6, are located on the outer periphery of base 10 on opposite sides of port $HP_C$.

Base 10 further includes a stop 11 on its inner face. This stop cooperates with the valve member 20 to locate that member in its two operational positions, one producing a cooling mode of operation, and the other producing a heating mode of operation.

As shown particularly in FIG. 2, the control face of valve member 20 (that facing base 10) includes two closed-loop, concentric rib formations 21, 22. Rib formation 21 is an inner closed loop centrally of the control face of valve member 20; it defines an inner low pressure cavity or section 23 in the central region of that face which is in communication with the low pressure port $LP_C$ in base 10. Rib formation 22 is an outer, annular closed loop; it defines with inner rib formation 21, an outer high-pressure section completely circumscribing the inner low-pressure section 23 and in communication with the high pressure port $HP_C$ of base 10. High-pressure section 24 includes two side portions 24a,
24b, joined together by passageways 24c, 24d, so as to completely surround the low-pressure section 23.

For purposes to be described below, a small hole 25 is formed through the high pressure section 24 of valve member 20, and a larger hole 26 is formed through its low pressure section 23.

The opposite face of valve member 20 (shown in FIG. 1) faces the coupling disk 40. This face includes an outer peripheral wall 27 formed with two cam surfaces 28, which extend radially inwardly of the valve member at diametrically-opposite locations thereon, and a slot 29 extending through an arc of approximately 60°. As will be described more particularly below, cam surfaces 28 and slot 29 cooperate with coupling disk 40 to couple the valve member 20 to the drive via a lost-motion coupling enabling the coupling disk to be rotated a small amount without rotating the valve member.

As indicated earlier, drive 30 is divided into two sections. One section includes parts enclosed within housing 50 containing the valve member 20 and the coupling disk 40; whereas the other section is externally of housing 50 and is enclosed within the second housing 60 secured to the upper end of housing 50.

The parts of drive 30, located externally of housing 50 (and within housing 60) include a motor 31, preferably a step motor, having a rotary shaft 32 for rotating a disk 33. Disk 33 carries a pair of permanent magnets 33a, 33b on opposite sides of the disk and diametrically aligned with its axis of rotation.

The parts of drive 30 located internally within housing 50 include another disk 34 rotatably mounted on a pin 35 secured to a rotatable end disk 35a. Disk 34 carries a pair of permanent magnets 34a, 34b diametrically aligned with the axis of rotation of disk 34. Permanent magnets 34a, 34b on disk 34 within housing 50 are of the same circular configuration as permanent magnets 33a, 33b on disk 33 within housing 60, and are adapted to be axially aligned with those magnets to produce a magnetic coupling between the two disks so that the rotation of disk 33 externally of housing 50 produces a corresponding rotation of disk 34 within housing 50.

The rotation of disk 34 within housing 50 is transmitted, via coupling disk 40, to the valve member 20 by means of a drive gear 36 carried by disk 34, and a step-down transmission 37 coupled to the coupling disk 40.

Step-down transmission 37 is of a two-stage planetary-gear type best seen in FIG. 3. It includes an outer housing 37a formed with a central opening for receiving drive gear 36 of disk 34, a ring gear 37b fixed to the inner face of housing 37a, and two stages 38a, 38b of planetary gears cooperable with ring gear 37b. The first stage 38a includes three planetary gears meshing with ring gear 37b for rotating a disk 39. Disk 39 is in turn fixed to a drive gear 39a meshing with the three planetary gears of the second stage 38b, the latter gears also meshing with ring gear 37b. The arrangement is such that fast rotation of disk 34 produces a slow rotation of disk 39, and its planetary gear 38b of the step-down transmission 37. A projection 50a on the inner face of housing 50, received within a corresponding recess in the transmission housing 37a, prevents rotation of the transmission housing during the rotation of the planetary gears.

Coupling disk 40 is formed with three stems 41 received within the openings in the three second-stage planetary gears 38b such that the slow rotation of disk 39 at the output end of the step-down transmission 37 produces a slow rotation of the coupling disk 40. This rotary movement of coupling disk 40 is transmitted to the valve member 20 in a yieldable manner by a pair of radially-extending, spring-urged coupling pins 42, 43, engaging cam surfaces 28 on the inner surface of the annular wall 27 of the valve member 20, as best seen in FIG. 1.

Coupling disk 40 not only couples the valve member 20 to the drive, but also cooperates with the large hole 26 for controlling the fluid pressure applied to the valve member. For the later purpose, coupling disk 40 is provided with a pair of pilot valve elements 44,45, each adapted to cover or uncover the large hole 26 according to the position of coupling disk 40 with respect to the valve member 20. Coupling disk 40 further includes a depending pin 46 received within slot 29 in valve member 20, limiting the rotation of the coupling disk 40 with respect to the valve member.

The change-over operation, wherein the air-conditioning system is changed-over from a cooling mode (in the summer) to a heating mode (in the winter), or vice versa, will now be described particularly with reference to FIGS. 4a–6b.

Figure 5A:
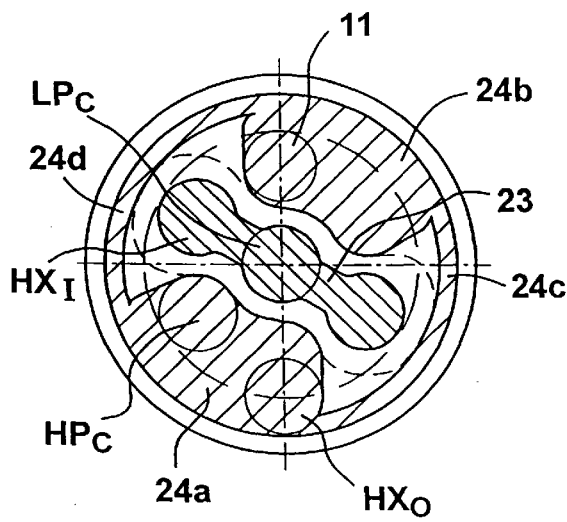
FIGS. 5a and 5b illustrate, along section lines V—V, FIG. 3, the two normal operational positions of the valve member in the valve assembly of FIG. 1.

It will be assumed that the valve member 20 is in the position illustrated in FIG. 5a, which produces a cooling mode of operation of the air conditioning system as illustrated in FIG. 6a. In this operational position of the valve member 20, the low-pressure from port $LP_C$ (connected to the low-pressure side of compressor 2) is connected to port $HX_I$ leading to the inside heat-exchanger 4, and the high-pressure from port $HP_C$ (connected to the high-pressure side of the compressor) is connected to port $HX_O$ leading to the outside heat-exchanger 6, thereby producing a cooling mode of operation as shown in FIG. 6a.

When the valve member is in the operational position of FIG. 5a, the high-pressure appearing in the high-pressure section 24 of the valve member is transmitted via the small hole 25, acting as a slow-acting vent, to the opposite side of the valve member (the side illustrated in FIG. 1). Since the surface area at this side of the valve member is much larger than the high-pressure surface area 24 at the opposite side of the valve member, this high-pressure applied via vent 25 is effective to firmly press valve member 40 against base 10, thereby producing a tight seal against leakage of gas.

When it is desired to change the operational position of the valve member in order to produce a heating mode of operation as illustrated in FIG. 6b, motor 31 of the drive is energized to rotate drive disk 33, which as described above, is externally of housing 50. However, the magnetic coupling produced by permanent magnets 33a, 33b on the external drive disk 33, and magnets 34a, 34b on the internal drive disk 34, transmits the rotary motion of motor 31 to the internal drive disk 34 via the step-down transmission 37 within housing 50. The rotary speed of drive disk 34 is thus reduced by the two-stage planetary gearing transmission of the step-down transmission 37, to rotate coupling disk 40, coupled to the second stage planetary gearing by stems 41, at a relatively low speed. For example, each stage of the two-stage transmission 37 could produce a step-down ratio of 25:1 so that the step-down transmission ratio of the complete transmission 37 is 50:1.

Figure 4A:
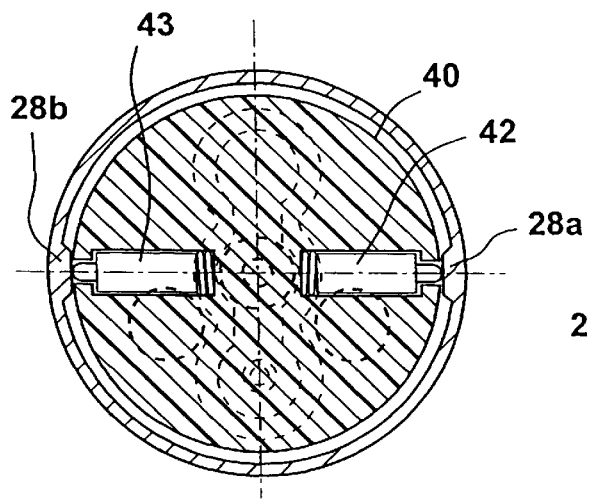
FIGS. 4a and 4b illustrate, along section lines IV—IV, FIG. 3, two positions of the coupling disk with respect to the valve member in FIG. 1.
Figure 4B:
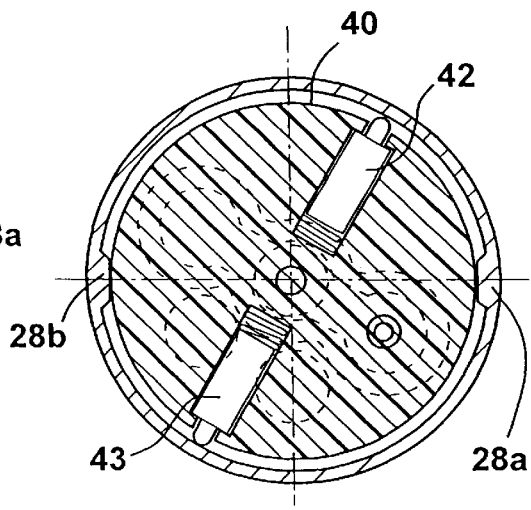

In the initial position of coupling disk 40 (as shown in FIG. 4a before it begins to rotate), its pin 46 is in one end of slot 29 (FIG. 1) of the valve member 20. Also, one of its pilot valve elements 44,45, closes the large opening 26 in the valve member 20, to produce the high-pressure sealing effected by the small opening 25, as described above.

Immediately upon the initial movement of the coupling disk 40, and before the valve member 20 begins to move, the large hole 26 in the valve member is uncovered by the respective pilot valve element 44,45. This immediately releases the high pressure pressing valve member 20 against base 10, thereby enabling the valve member to be easily rotated by coupling disk 40.

Figure 5B:
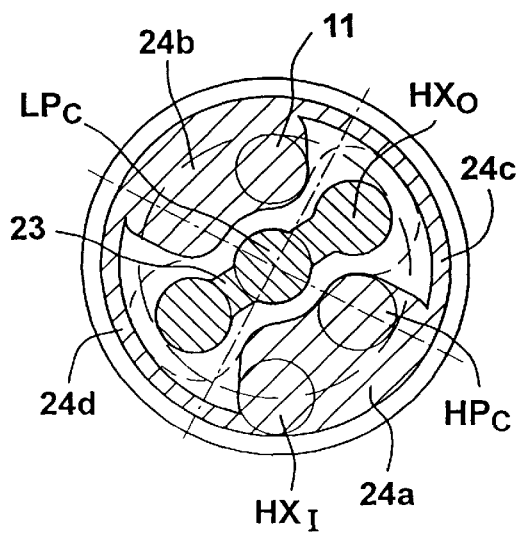
Figure 7:
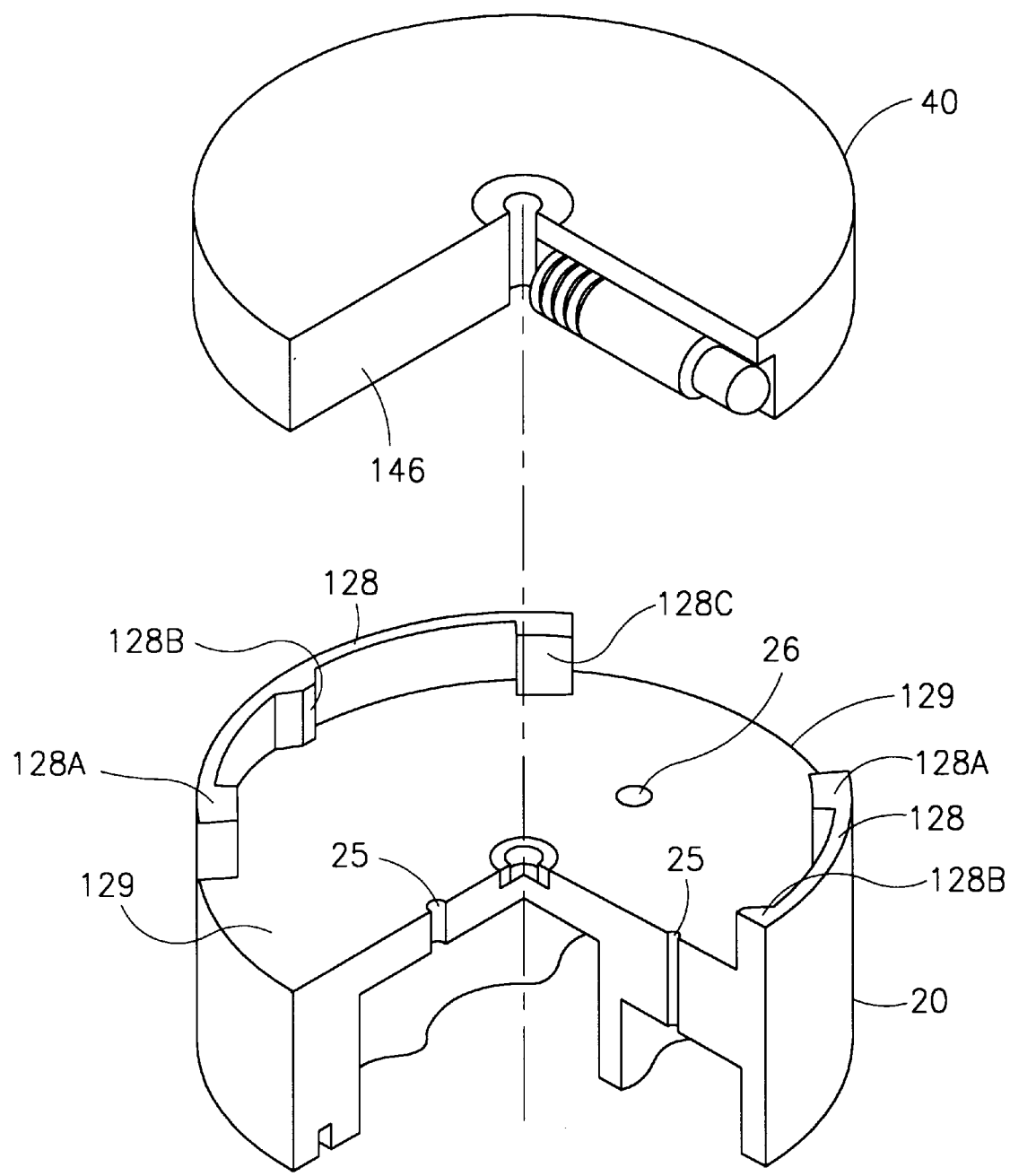
FIGS. 7 and 8a–8c illustrate a variation in the construction of the coupling disk and the valve member.

Rotation of coupling disk 40 causes the spring-urged pins 42, 43 of the coupling disk to move relative to valve member 20 (FIG. 4b) until they engage cams 28 on the inner surface of peripheral wall 27 of the valve member and thereby rotate the valve member to the operational position illustrated in FIG. 5b. This position is determined by the engagement of stop 11 of base 10 with the opposite end of the outer high-pressure section 24 of the valve member. Stop 11 thus prevents further rotation of valve member 20 so that the coupling disk 40 now rotates relative to the valve member to bring its other pilot valve element 44,45, over the large hole 26, and thereby to reinstate the high-pressure seal applied to the valve member by the slow-acting vent 25. The valve member is thus now in the position illustrated in FIG. 5b, determined by pin 46 engaging the opposite end of slot 29, thereby producing a heating mode of operation of the air conditioning system as illustrated in FIG. 6b.

In the illustrated construction, the above-described change-over operation takes 1.0 to 1.5 seconds. However, may be slowed down if desired, by controlling the valve motor 31, e.g. to avoid sudden shocks to the air-conditioning system.

Whenever it is a desired to make a change-over to a cooling mode of operation, motor 31 is energized in the reverse direction, whereupon the same sequence of events as described above occur to move the valve member 20 back to the position illustrated in FIG. 5a, to thereby produce a cooling mode of operation of the air conditioning system as illustrated in FIG. 6a.

FIGS. 7 and 8a–8c illustrate a variation wherein the cam surfaces 28 are in the form of curved elongated elements 128 having three cam formations 128a, 128b, 128c. Each cam formation 128 extends for an arc of about 120°. They are separated by slots 129 each of approximately 60°, corresponding to arcute slot 29 (FIG. 1). In addition, the coupling disk 40 is provided with two radial ribs 146 which move in slots 129 and thus serve the same function as pin 46 movable within slot 29 in FIG. 1, as described above.

Figure 8A:
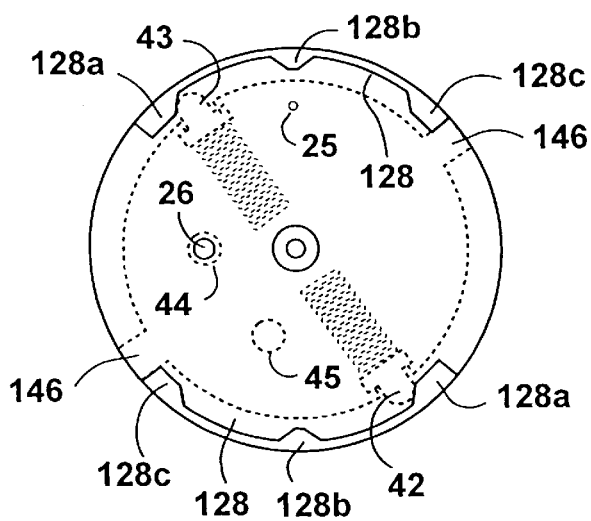
Figure 8B:
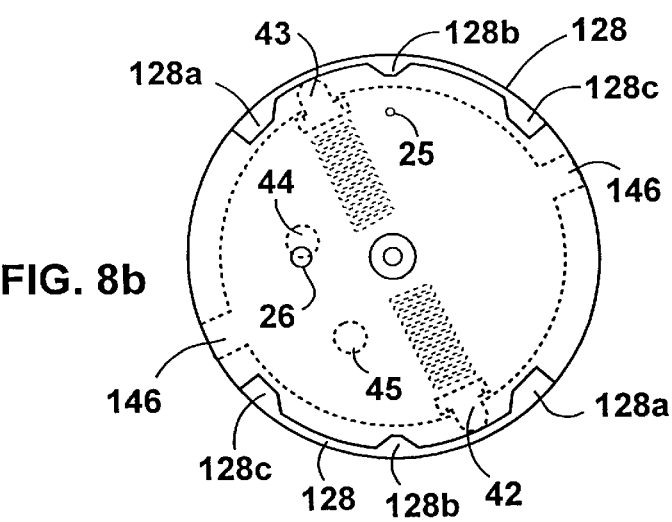
Figure 8C:
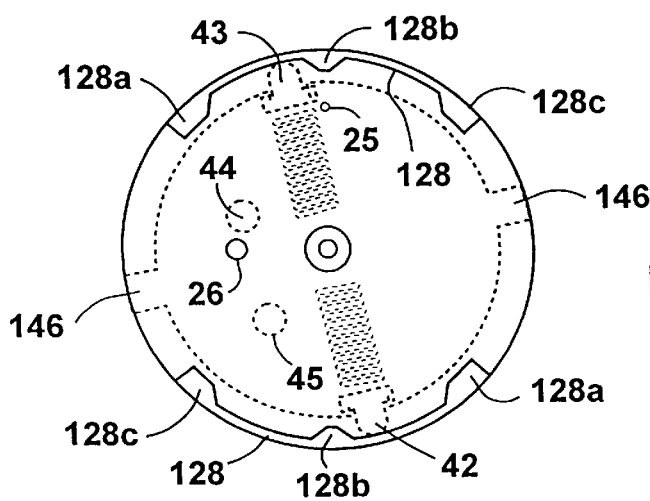

As shown particularly in FIG. 8a–8c, the spring-urged pins 43 of coupling disk 40 operate with cam surfaces 128a, 128b, 128c of the two cam elements 128 in the same manner as described above, first to release the high sealing pressure applied to valve member 20, then to rotate the valve member to its new operational position, and then to restore the high-sealing pressure applied to the valve member. Thus, when the valve member is precisely in an operational position, pilot valve element 44 of the coupling disk, being precisely over opening 26 in the valve member (FIG. 8a), is closed, such that the high-sealing pressure is applied to the valve member as describe above. When the valve member is to be moved to a new operational position, coupling disk 40 is first rotated to displace pilot valve element 44 away from opening 26 (FIGS. 8b, 8c), thereby releasing the high sealing pressure, such that when pins 42, 43 engage the middle cam surface 128b, the coupling disk will rotate the valve member to its new operational position. It is stopped in this operational position by pin 11 as described above, whereupon coupling disk 40 will continue to move, overcoming the middle cam surface 128b until it reaches the end cam surface 128c; at that position its other pilot valve element 45 now covers opening 26 to thereby restore the high sealing pressure to the valve member.

An important characteristic of the described valve assembly is that it automatically maintains the valve member 20 very close to the base 10, separated by a thin air cushion, all the time the valve member is not precisely in one of its two operational positions. This close spacing is automatically self-regulated all the time the valve member is not precisely in one of its operational positions by leakage from the circular high pressure section 24 at the ribbed face of valve member 20 to the opposite face of the valve member. Thus, should valve member 20 tend to tilt or separate from base 10 at any point around the circumference of the valve member, the so-produced space will cause the high pressure from the annular high pressure section 24 to be applied via this space to the opposite face of valve member 20, thereby restoring the valve member to its close position with the base.

This regulated action of the valve member 20 thus produces a thin air cushion which facilitates the change-over operation for changing from one operational mode to another. While this air cushion produces some leakage it is relatively small such that the high-pressure section of the valve member is still substantially isolated from the low-pressure section sufficiently to enable the valve assembly to also serve as a control valve and to perform many important control functions within an operational mode. Described below, for purposes of example, are anti-frosting or defrosting control, and output-reduction control, both of which may be performed by the described valve assembly in either of the two operational modes of the air-conditioning system and without interrupting the operation of the air-conditioning system.

Figure 9:
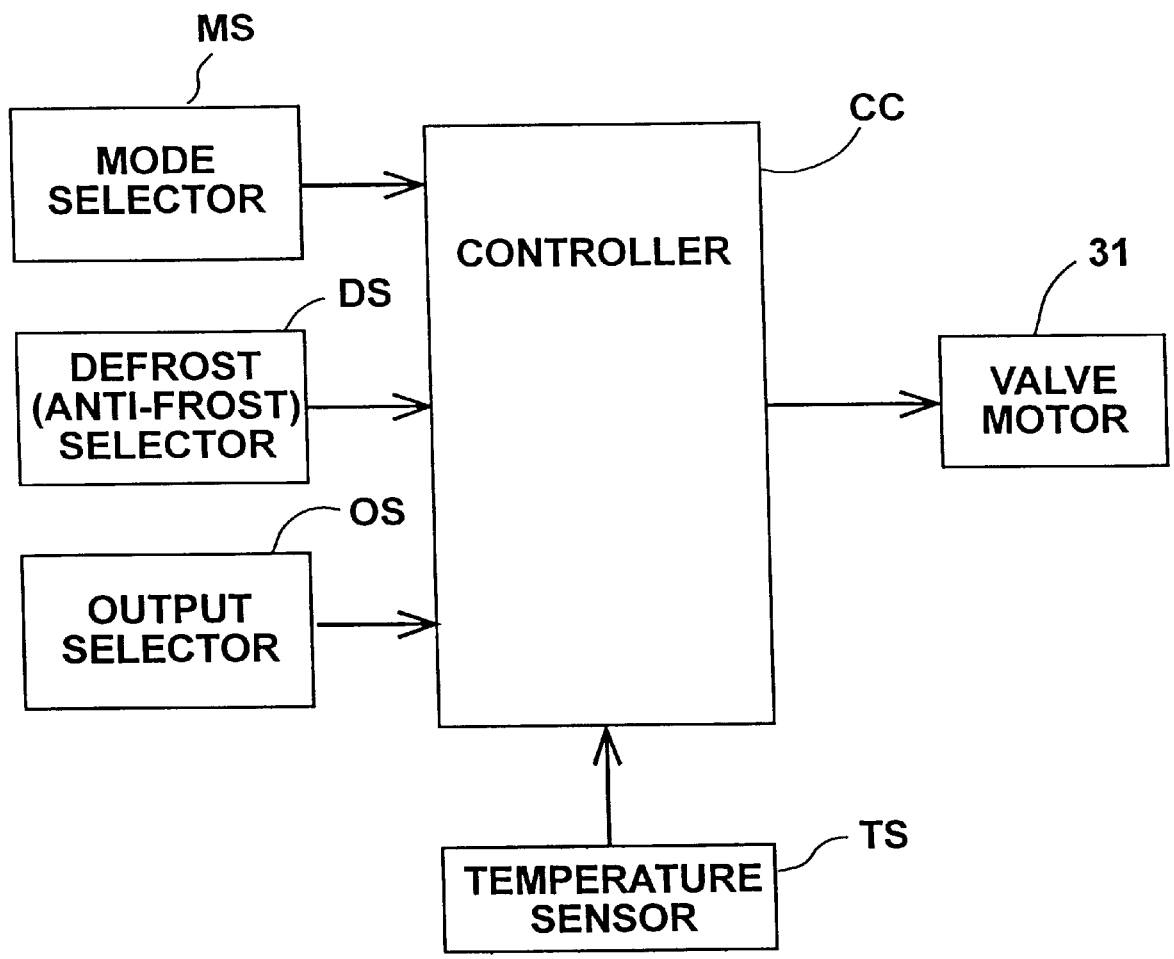
FIG. 9 schematically illustrates an electrical control system for controlling the rotary motor in the valve assembly to provide not only change-over from one operation to another, but also to provide controlled leakage or bleeding from the high-pressure section to the low-pressure section, in order to prevent frosting or to defrost without interrupting the operation of the system.

FIG. 9 diagramatically illustrates an electrical circuit for controlling the valve motor 31 of the valve assembly both for a mode change-over operation, and also for a control operation within one of the modes. The system illustrated in FIG. 9 includes a control circuit CC for controlling the valve motor 31; a mode selector MS for operating the system according to the cooling mode (in the summer), or the heating mode (in the winter); a defrost selector DS for producing an anti-frosting or defrosting control operation within one of the two operational modes; and an output selector OS for controlling the output of the system without interrupting the operation of the system. Also illustrated in FIG. 9 is a temperature sensor TS which senses temperature, e.g., the outside ambient temperature, and produces an output to the control circuit CC automatically controlling valve motor 31 in order to prevent frost, or to defrost, in a very efficient manner and without interrupting the operation of the system.

The described valve assembly enables the air-conditioning system to be operated in order to prevent frosting, to defrost, or to provide other temperature controls, both in the cooling mode and the heating mode. The manner in which this is accomplished is illustrated in FIGS. 10a–10f.

In FIGS. 10a–10f, the ports $LP_C$, $HP_C$, $HX_I$, $HX_I$ are correspondingly marked as in FIGS. 5a and 5b. However, the rib formation 21, which defines the inner low-pressure region 23 and the outer, annular high-pressure region 24, is not of even thickness as illustrated in FIG. 2, but rather of varied thickness as shown by the section lines 121 in FIGS. 10a–10f. This is preferable particularly for the output-reduction control to be described below.

Figure 10A:
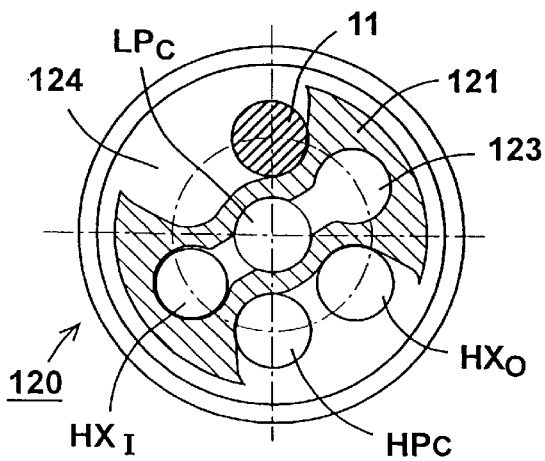
FIGS. 10a–10f are views, similar to those of FIGS. 5a and 5b, illustrating how controlled leakage may be produced to prevent frosting or to defrost.
Figure 10B:
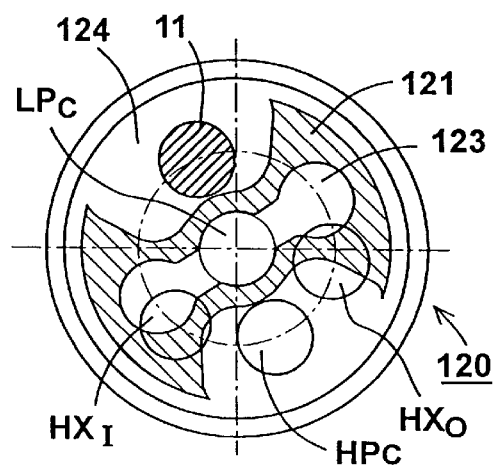
Figure 10C:
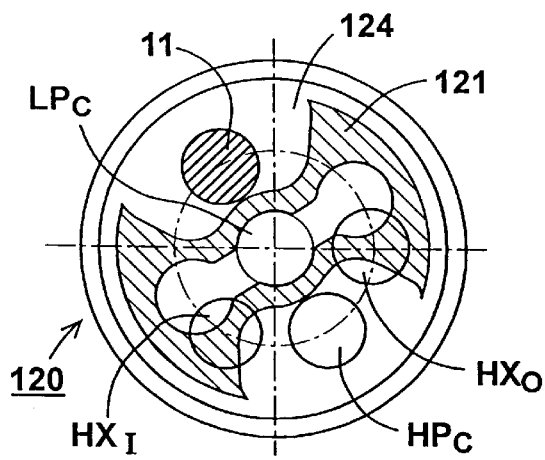
Figure 10D:
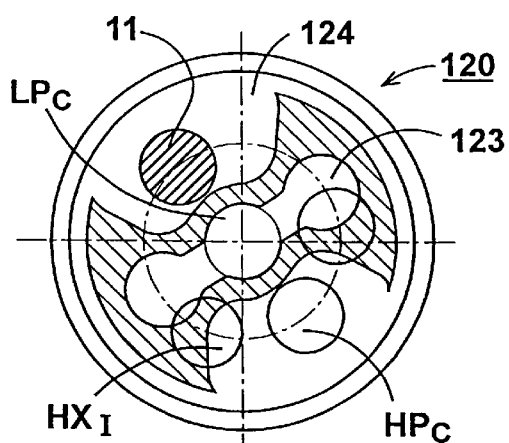
Figure 10E:
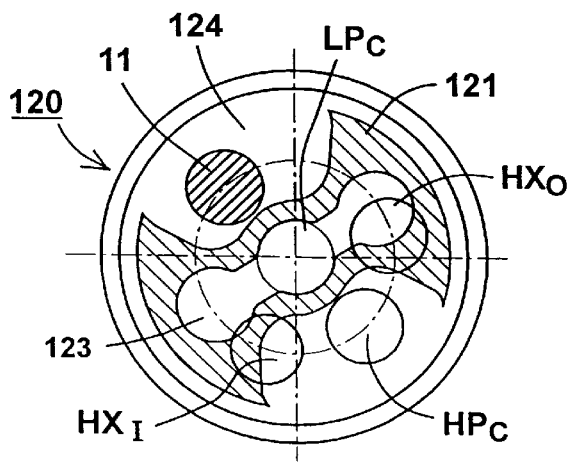

FIG. 10a illustrates the position of the rotary valve member 120 with respect to the four ports in the base (10, FIG. 1) to produce a cooling mode of operation as described above particularly with respect to FIG. 5a. Whenever it may be desired to prevent frosting, to defrost, or to provide other temperature controls, valve member 120 may be moved, via the coupling disk (40, FIG. 1) to produce a controlled leakage or bleeding between the high-pressure outer region 124 produced by the high-pressure port $HP_C$, and the low-pressure central region 123 coupled to the low-pressure port $LP_C$, corresponding to the amount of leakage desired. The leakage not only influences the pressure of the gas in each region but also influences the temperature in each region.

Figure 10F:
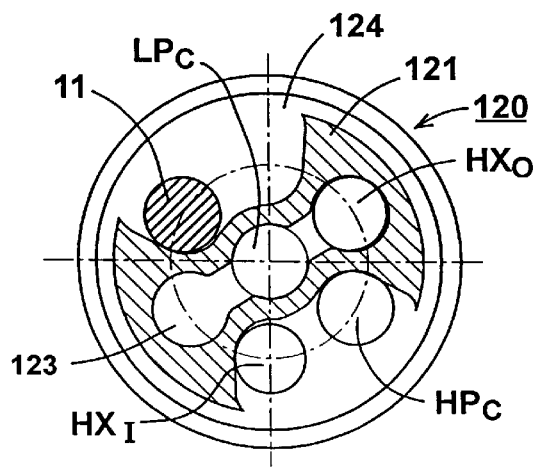

FIGS. 10b–10e illustrate how this leakage may be increased, as desired, until the second operational position, namely the heating mode, is reached as illustrated in FIG. 10f. It will be appreciated that the greater the leakage, the greater will be the anti-frosting or defrosting results.

This leakage to prevent frosting (or to defrost) may be automatically controlled in response to the outside ambient temperature by temperature sensor TS illustrated in FIG. 9. For example, when the system is operating according to the cooling mode, and the outside ambient temperature drops, this will be sensed by temperature sensor TS to automatically control, via circuit CC, the valve motor 31 to produce a controlled leakage of high temperature gas to the region to be warned in order to prevent frosting or to defrost.

This control may be a periodic one, wherein valve motor 31 (FIG. 1) would be controlled to periodically move the valve member to one of the positions illustrated in FIGS. 10b–10e and then back to its normal operating position. This periodic control of leakage may be effected by periodically controlling the amplitude of the leakage (per FIGS. 10b–10e), the time interval of each period of leakage, and/or the frequency at which the leakage is effected. Such a control, may also be continuous, wherein a continuous leakage could be provided having a magnitude depending on the output of the temperature sensor to prevent frosting. This leakage can also be produced manually by operating defrost selector button DS (FIG. 9), or automatically in response to temperature. Such an anti-frosting or de-frosting operation is easily permitted by the described valve assembly without interrupting the overall operation of the system since: (1) the valve motor 31 can be precisely controlled by the control circuit CC; (2) since the valve member may be easily rotated to any desired position with respect to base 10; and (3) the regulated light contact, or very close spacing, of the valve member with respect to the base, whenever the valve member is not in one of its operational positions, substantially isolates the high-pressure section from the low-pressure section sufficiently to permit this type of control.

An anti-frost or defrost control as described above provides a number of important advantages. It enables the air-conditioning system to be operated for maximum efficiency without danger of frosting. It also permits the system to be operated continuously, and not to be interrupted or reversed, thereby saving considerable energy, maximizing the utilization of the air-conditioning system, and avoiding undesireable interruption of the compressor.

Figure 11A:
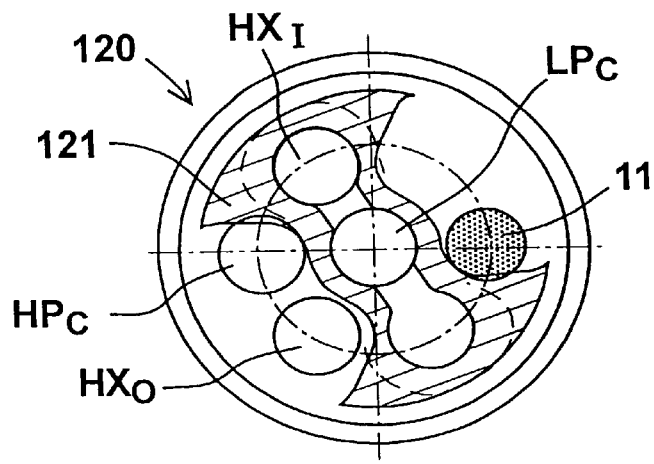
FIGS. 11a–11c are views similar to those of FIGS. 10a–10c illustrating how the valve assembly may be operated to reduce capacity without interrupting the operation of the system.
Figure 11B:
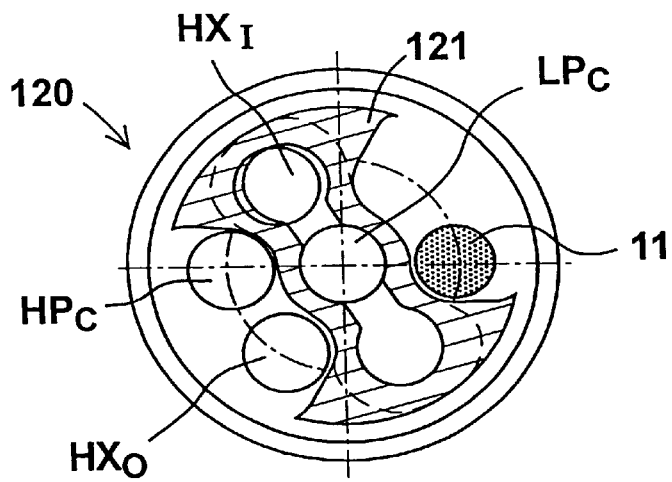
Figure 11C:
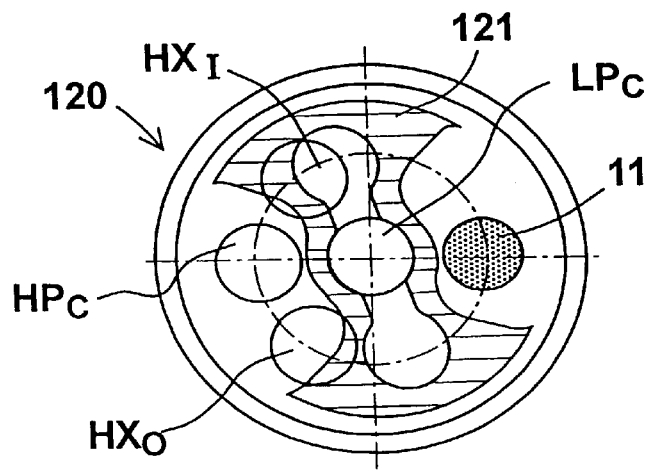

FIGS. 11a–11c illustrate how the novel valve assembly may be modified to produce a desired output-reduction in the air-conditioning system without interrupting its operation. For example, air-conditioning systems are normally designed for maximum efficiency at a pretermined output, and if the needed output is to be reduced, e.g. because of a decrease in the space to be heated or cooled, it is usually necessary to interrupt the operation of the system. However, such an operation of a normal air-conditioning system reduces its overall efficiency, wastes considerable energy, accelerates wear, etc., because of frequent interruptions of the system.

The valve assembly of the present invention permits the output of the air-conditioning system, both in the cooling mode and in the heating mode, to be reduced as desired without interrupting the operation of the system. This can be done, for example, by controlling the valve motor 31 to produce a controlled reduction in the effective cross-sectional area of the low-pressure port $LP_C$ exposed to the heat-exchanger connected to it. Thus, FIG. 11a illustrates the valve member 120 in a cooling-mode position wherein its rib 121 fully opens the low-pressure port $LP_C$ exposed to the inside heat-exchanger port $HX_I$, thereby producing 100% suction; FIG. 11b illustrates the valve member position wherein rib 121 covers about 25% of the cross-sectional area of the low-pressure port $LP_C$, thereby producing about 75% suction; and FIG. 11c illustrates the valve member position wherein rib 121 covers about 75% of the cross-section area of the low-pressure port $P_1$, thereby producing about 25% suction.

Such an output-reduction operation may also be performed periodically, continuously, or as required by the motor control circuit CC controlling valve motor 31, as described above with respect to the temperature control, and does not require interrupting the operation of the air-conditioning system.

Figure 12A:
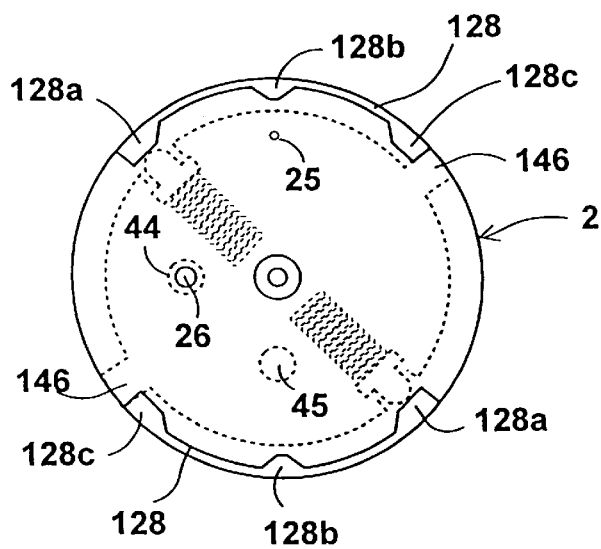
FIGS. 12a–12c corresponds to FIG. 8a–8c but illustrate a modification wherein the valve assembly is operated to perform a control function without interrupting the operation of the system.
Figure 12B:
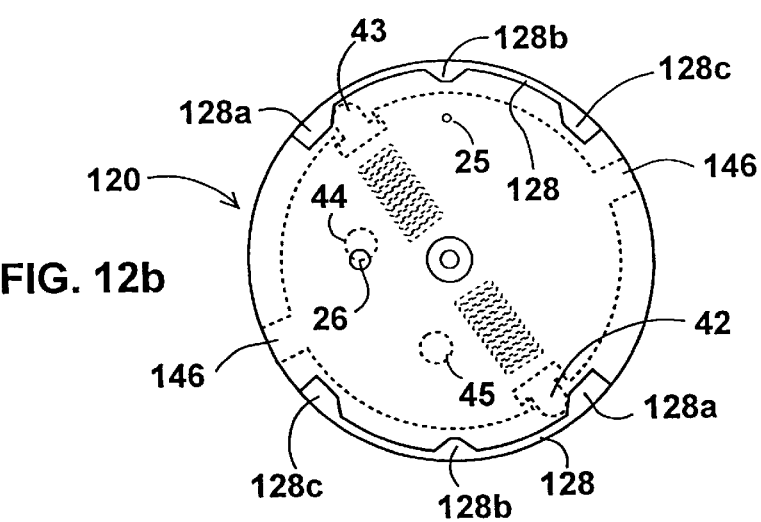
Figure 12C:
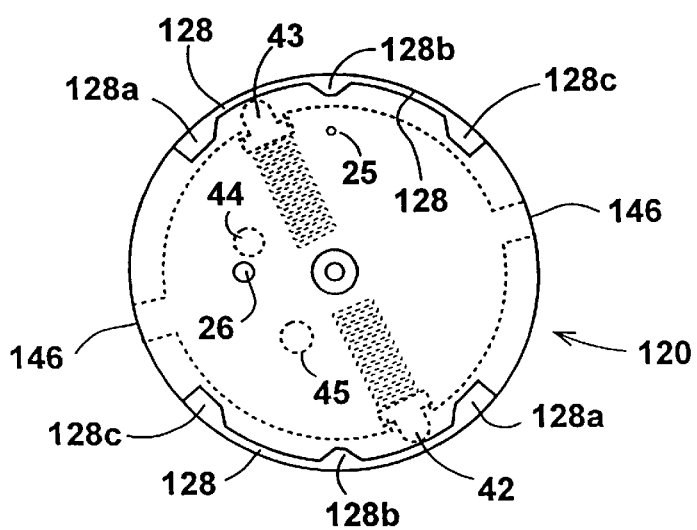

FIGS. 12a–12c are views corresponding to those of FIGS. 8a–8c but including slight modification of the valve member 120 with respect to the location of the cam elements 128, engageable by the spring-urged pins 42, 43, to better assure that the coupling disk 40 will not move to a position causing its pilot valve elements 44, 45, to cover the low-pressure opening 26 in the valve member except when the valve member is precisely in one of its two operational positions. Thus, the spring-urged pins 42, 43, engage the cam element high points 128a, 128c only after a pilot valve element 44, 45 closes the low-pressure port 26 to reapply the high sealing pressure against the valve member (FIG. 12c).

The illustrated valve assembly may be used for performing other control functions within either of the two operational modes. For example, the valve motor 31 may be controlled merely to periodically move coupling disk 40 sufficiently to cause its pilot valve elements 44 or 45 to unseat opening 26, and thereby to bleed-off a small amount of high-pressure, without actually moving valve member 20. Such an operation may be desired to perform a small hot-gas bypass control as often as may be necessary.

The illustrated valve assembly may also be used for controlling a different number of ports. FIG. 13 illustrates an example wherein the valve assembly includes only three ports, namely a low-pressure port $P_1$ a high pressure point $P_2$, and a further port $P_3$ to selectively receive either the low pressure from port $P_1$ or the high pressure from port $P_2$.

FIG. 14 illustrates a valve assembly including five ports, of which ports $P_1$–$P_4$ are the four ports described above (e.g. FIG. 2), the fifth port $P_5$ being provided to selectively apply high-pressure to the evaporator, for example, for defrosting or other control purposes.

Figure 16A:
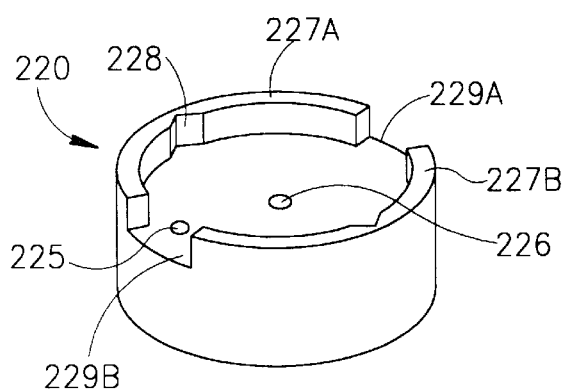
FIG. 16a and 16b are three-dimensional views illustrating the two opposite sides of the valve member in the assembly of FIG. 15.
Figure 16B:
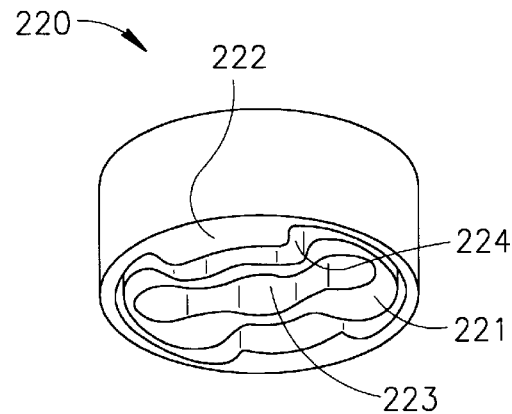
Figure 17A:
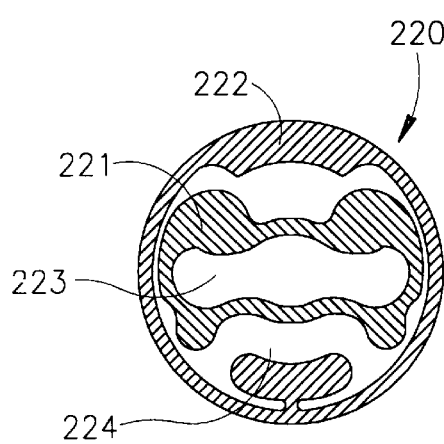
FIG. 17a is a bottom view illustrating the control face of the valve member in the valve assembly of FIG. 15.
Figure 17B:
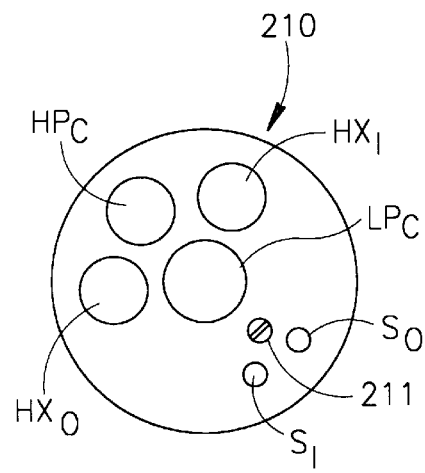
FIG. 17b is a top view illustrating the base-mounted ports co-operable with the valve member in the valve assembly of FIG. 15.

FIG. 15 illustrates a valve assembly very similar to that described above with respect to FIGS. 1–3, and therefore in order to facilitate understanding, corresponding parts have been identified by the same reference numerals. The main differences between the two structures appear in the base, and in the valve member, identified as 210 and 220, respectively, in FIG. 15. FIG. 16a more particularly illustrates the side of valve member 220 facing the coupling disk 40; FIGS. 16b and 17a more particularly illustrate the side of the valve member facing the base 210; and FIG. 17b more particularly illustrates the base 210 cooperable with the valve member 220.

Figure 18A:
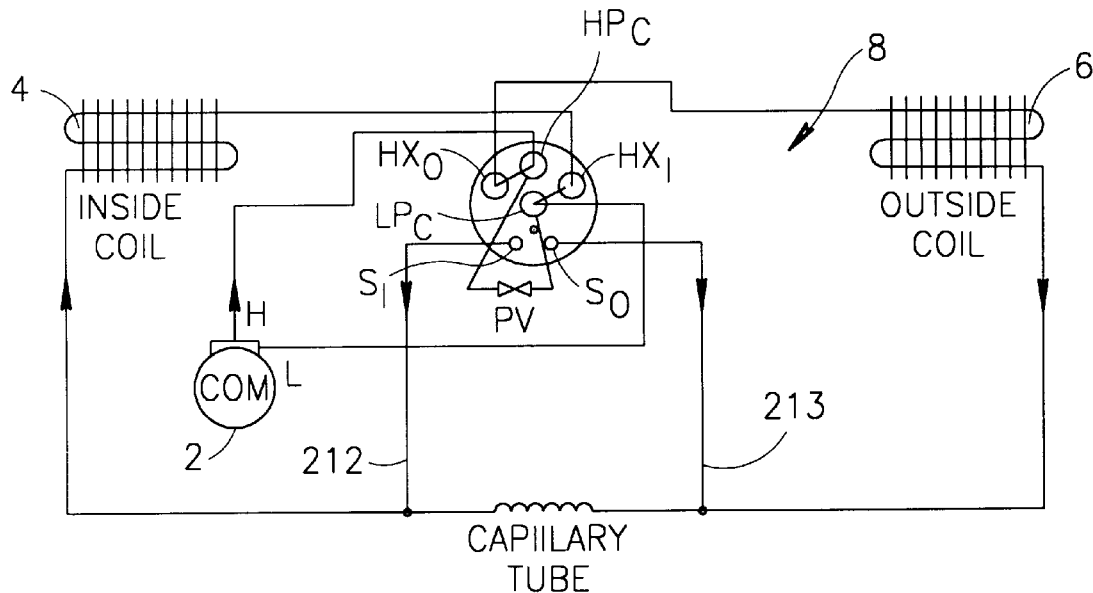
FIGS. 18a and 18b illustrate an air-conditioning system including the valve assembly of FIG. 15, with the valve member in the cooling mode position and heating mode position respectively.
Figure 18B:
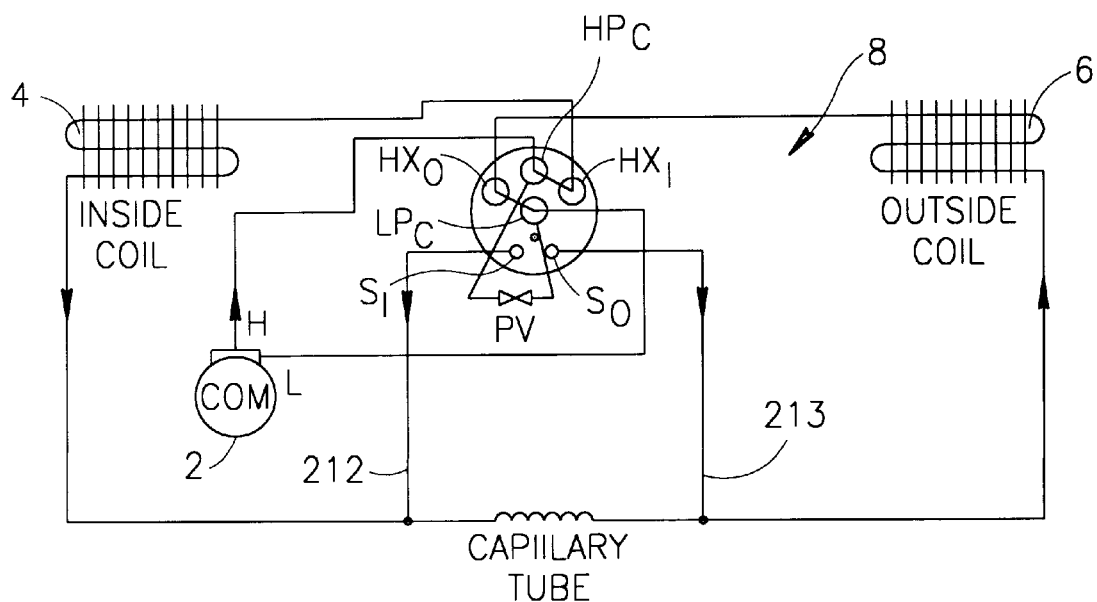

Base 210 mounts the same four ports $LP_C$, $HP_C$, $HX_I$, $HX_O$ as in FIG. 1, which ports are connected by lines ($L_1$–$L_4$, FIG. 1) to the compressor 2, the inside heat exchanger 4, and the outside heat exchanger 6 (FIGS. 18a, 18b). Base 210 also includes a stop 211, corresponding to stop 11 in FIGS. 1–3 but of smaller diameter. Stop 211 is straddled on its opposite sides by two additional ports, namely: a shunting port $S_I$, connecting a shunt line 212 (FIGS. 18a, 18b) to the inside heat exchanger 4, and a shunting port $S_O$ connecting a second shunt line 213 to the outside heat exchanger 6.

The control face of valve member 220, as illustrated particularly in FIG. 17a, also includes an inner closed-loop rib 221 defining a central low-pressure section 223, and an outer annular rib 222 defining, between it and rib 221, an outer, annular high-pressure section 224 enclosing the inner low-pressure section 223. The two closed-loop ribs 221 and 222 are specially shaped to cooperate with the ports in the base 210, as will be described more particularly below.

As in the previously-described embodiments, valve member 220 also includes a small hole 225 connecting the high pressure section 224 to the opposite face of the valve member for applying high pressure thereto; and a larger hole 226 leading from the low-pressure section 223, and co-operable with a pilot valve 244 on coupling disk 40, for releasing the high pressure when it is desired to change-over the valve from one operational position to another.

The side of valve member 220 facing coupling disk 40 is somewhat different in structure from that described above. As shown particularly in FIG. 16a, this side of valve member 220 is formed with a peripheral rib 227a, 227b on each of its opposite sides, each formed with a central recess 228. The two peripheral ribs extend for 120° to define a 60° slot 229a, 229b, at each of its opposite sides.

As will be described below, recesses 228, serve as detents for releasably receiving the two spring-urged pins 42, 43 of the coupling disk 4 when the coupling disk is precisely in position wherein its pilot-valve 244 closes the large opening 226 in valve member 220; whereas slot 229a, 229b cooperate with radial projections 246a, 246b in the coupling disk 40 to rotate the valve member 220 to any desired position after the high-pressure applied to the valve member has been released by opening the pilot valve hole 226.

FIGS. 18a and 18b illustrate the position of the valve member 220 with respect to the base 210 for producing a cooling mode of operation and a heating mode of operation, respectively, corresponding to FIGS. 6a and 6b in the earlier described embodiments. The valve illustrated in FIG. 15 may also be controlled in the manner described above with respect to FIGS. 10a–10f to produce any desired leakage control from the high pressure section to the low pressure section of the control valve for temperature control purposes, or as described above with respect to FIGS. 11a–11c to control the output of the system by controlling the cross-sectional area of the low-pressure port $LP_C$ exposed to the respective heat exchanger.

The valve illustrated in FIG. 15, however, may be operated to perform further control functions. Thus, the provision of the two shunting ports $S_I$, and $S_O$ in the base 210 permits the valve also to control the shunting of gas to selected locations in the system via the shunting lines 212, 213 for temperature control purposes; also, the lost-motion construction of the side of valve member 220 facing the coupling disk 40 enables the motor also to be used for selectively opening or closing the pilot valve PV (element 244 moveable with respect to opening 226) at any position of the valve member (i.e. in either of the two mode positions, or any intermediate position between them), e.g. to exert a moderate control of temperature or pressure whenever, and as often as deemed necessary, without actually moving the valve member 220.

The foregoing operations are more particularly illustrated in FIGS. 19–24.

Figure 19A:
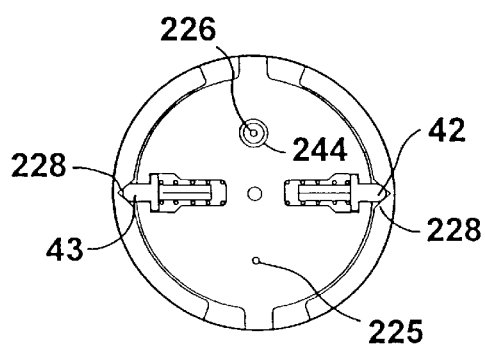
FIGS. 19 and 19a diagrammatically illustrate the valve assembly of FIG. 15 in its normal cooling position.
Figure 19:
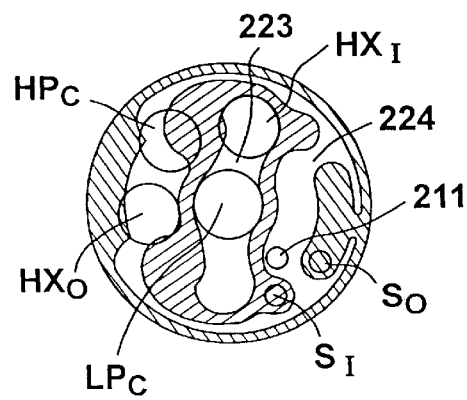

FIG. 19 illustrates a straight cooling mode, wherein the low pressure port $LP_C$ is coupled to the inside heat exchanger port $HX_I$, and the high pressure port $HP_C$ is connected to the outside heat exchanger port $HX_O$. In the position illustrated in FIG. 19, neither of the shunts $S_I$, $S_O$ is active. FIG. 19a illustrates the normal closed position of the pilot valve 244, i.e., closing hole 226, such that high pressure is applied via hole 225 to the opposite side of the valve member 220.

Figure 20B:
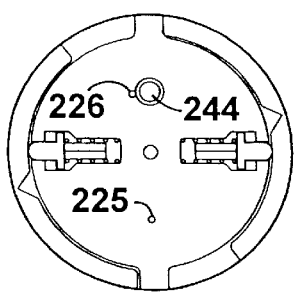
Figure 20A:
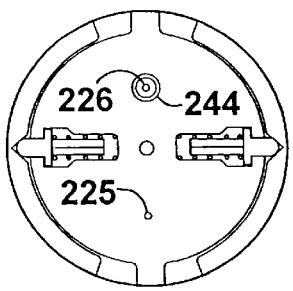
Figure 20:
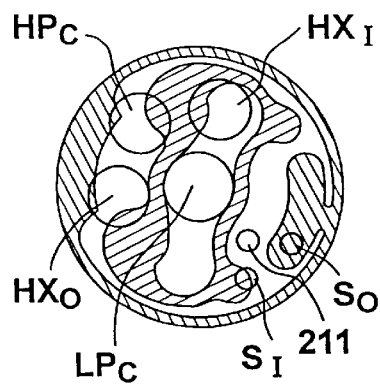

FIG. 20 illustrates the valve member 220 moved slightly (clockwise) to partially expose shunt port $S_I$ to the high pressure cavity 224, to thereby shunt a portion of the high pressure gas to the inside heat-exchanger 4. This may be desired, for example, to provide a small hot-gas bypass in order to prevent freezing of the inside heat-exchanger. The valve member also slightly reduces the cross-sectional of the inside heat-exchanger port $HX_I$ exposed to the low pressure, but this is not significant here.

FIGS. 20a, 20b illustrate that, in the valve position of FIG. 20, the pilot valve 244 may also be closed (FIG. 20a), or open (FIG. 20b) in order to perform a small hot-gas bypass control, if so desired, without interrupting the operation of the compresser.

Figure 21B:
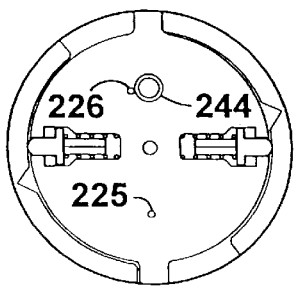
Figure 21A:
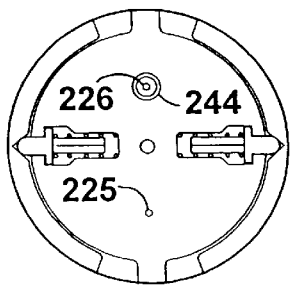
Figure 21:
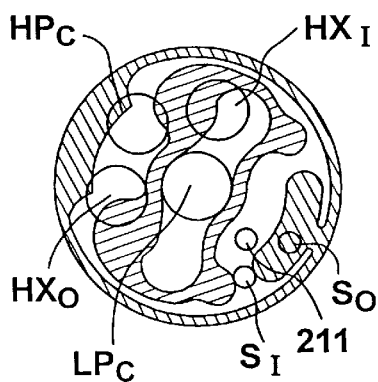

FIGS. 21, 21a, and 21b, illustrate similar conditions as FIGS. 20, 20a, 20b, but with the full cross-section of the shunting port $S_I$ exposed to the high pressure section.

FIGS. 22, 22a, 22b illustrate the condition wherein both shunting ports $S_I$, $S_O$ are blocked, but a smaller cross-sectional area of the inside heat-exchanger port $HX_I$ is exposed to the low pressure section, thereby further reducing the output of the air-conditioning system; and FIGS. 23, 23a and 23b illustrate similar conditions but even with a further reduction in the air-conditioning output system. In both cases, the cross-sectional area of outside heat-exchanger port $HX_O$ exposed to the light pressure is also reduced, which thereby reduces the volume of the gas, and therefore this work load on the compresser.

FIGS. 24–27 illustrate similar controls when the air-conditioning system is in the heating mode.

It will thus be seen that the novel valve assembly as described above may be used not only as a change-over valve for changing from one operational mode to the other, but also as a control valve to perform a large number of controls in either of the operational modes. Many features of the present invention contribute to this advantageous result, particularly the construction of the valve member and the provision of the annular high-pressure section around and enclosing the low-pressure section, which self-regulates the valve member to produce a thin air cushion facilitating moving the valve member while maintain its control face, sufficiently close to the base to substantially isolate the high-pressure section from the low-pressure section in any position of the valve member. This construction of the valve member produces, in effect, variable gates which can variably control leakage or shunting from one pressure section to another (e.g. for temperature control purposes) or can variably control the cross-sectional area of the low-pressure section exposed to the heat exchanger (e.g. for output control purposes), both without interrupting the operation of the air-conditioner. Further, the control of the pilot valve in any position of the valve member also enables a small hot-gas bypass to be effected whenever desired and in any position of the valve member. Finally, using a motor drive, particularly a step-motor, enables very precise control, both automatically and manually, of the valve member to perform any of the above-described functions.

Therefore, while the invention has been described with respect to several preferred embodiments, it will be appreciated that these are set forth merely for purposes of example, and that many other variations of the invention may be made. For example, the invention can be used in manually-driven valve assemblies, or in valve assemblies for applications other than in air-conditioning systems. Certain features of the invention could be used without other features. For example, one or more of the above described control functions, e.g. leakage or shunting control, output control or pilot valve control, could be implemented in other change-over valve constructions. Those skilled in the art will be able to appreciate many other variation, modifications and applications of the invention, as defined by the following claims:

I claim:

1. A valve assembly for controlling the flow of a fluid between a plurality of ports including at least one high pressure port and one low pressure port, comprising:
   a base mounting said plurality of ports;
   and a valve member rotatable to a plurality of operational positions with respect to said base, said valve member having a control face facing said base to control the flow of fluid between said ports according to the position of the valve member with respect to said base, and an opposite face facing away from said base;
   said control face of the valve member being formed with a low pressure cavity in the central region thereof, and with an annular high pressure cavity in the outer region thereof completely circumscribing said low pressure cavity.

2. The valve assembly according to claim 1, further comprising:
   a slow-acting vent for applying high pressure from said high pressure cavity to said opposite face of the valve member, when the valve member is in an operational position, to firmly press the valve member into sealing contact with the base, and thereby to isolate the high pressure cavity from the low pressure cavity;
   a pilot valve which is normally closed but selectively openable to release the high pressure applied to said opposite face of the valve member, and thereby to enable the valve member to be moved to another operational position;
   and a passageway from said annular high pressure section of the valve member to said opposite face of the valve member to maintain said control face of the valve member sufficiently close to said base to substantially isolate the high pressure cavity from the low pressure cavity also when said pilot valve is open and said valve member is moved to another operational position.

3. The valve assembly according to claim 2, wherein said pilot valve, when opened, connects the high pressure at said opposite face of the valve member to said low pressure cavity to release the high pressure applied to said opposite face of the valve member.

4. The valve assembly according to claim 2, further comprising:

a rotary motor drive including an electrical motor, and a control circuit therefor for selectively moving the valve member from one operational position to another operational position in order to change-over the connections between said high pressure and low pressure ports, or to an intermediate position between said two operational positions in order to control the fluid flow with respect to said ports without making a change-over of the connections between said high pressure and low pressure ports.

5. The valve assembly according to claim 4, wherein said control circuit controls said rotary motor drive to selectively move said valve member to any one of a plurality of intermediate positions.

6. The valve assembly according to claim 4, wherein said control face of the valve member is constructed such that moving the valve member to said intermediate position controls fluid leakage from said high pressure cavity to said low pressure cavity.

7. The valve assembly according to claim 4, wherein said control face of the valve member is constructed such that moving the valve member to said intermediate position controls the effective cross-sectional area of said low pressure port exposed to said low-pressure cavity of the valve member.

8. The valve assembly according to claim 4, wherein said rotary motor drive also controls said pilot valve to selectively open or close it at any one of said operational or intermediate positions.

9. The valve assembly according to claim 8, wherein said rotary motor drive drives said valve member via a coupling disk which is directly coupled to the rotary motor drive and is coupled to the valve member via a lost-motion coupling such that the coupling disk may be rotated a small amount to open or close the pilot valve without rotating the valve member.

10. The valve assembly according to claim 9, wherein said coupling disk includes a spring-biased pin receivable within a recess in the valve member to releasably retain the coupling disk in a normal position closing said pilot valve, but rotatable by said rotary motor drive with respect to said valve member to open or close said pilot valve in any position of the valve member.

11. The valve assembly according to claim 9, wherein said coupling disk includes a pair of diametrically opposed spring-biased pins receivable within diametrically-opposed recesses in the valve member to retain the coupling disk in said normal position with respect to said pilot valve.

12. The valve assembly according to claim 9, wherein said lost-motion coupling between said coupling disk and said valve member comprises a projection carried by said coupling disk movable within a slot in said valve member.

13. The valve assembly according to claim 1, wherein said control face of the valve member is formed with a rib formation including inner and outer concentric, closed-loop ribs defining said low pressure cavity within the inner closed-loop rib, and said high pressure cavity between the two closed-loop ribs.

14. The valve assembly according to claim 13, wherein said closed-loop ribs are shaped such that, at least at one intermediate position of the valve member between its two operational positions, said ribs partially shunt fluid from said high pressure cavity to said low pressure cavity.

15. The valve assembly according to claim 13, wherein said closed-loop ribs are shaped such that, at least at one intermediate position of the valve member between its two operational positions, said ribs reduce the effective cross-sectional area of the low pressure port exposed to said low pressure cavity.

16. The valve assembly according to claim 13, further comprising:

at least one shunting port, and a shunting line from said shunting port for partially shunting fluid away from one of said cavities; said closed-loop ribs being shaped such that, at one intermediate position of the valve member, said ribs partially shunt fluid away from said one cavity.

17. The valve assembly according to claim 16, wherein there are a shunting port and a shunting line for each of said cavities, said closed loop ribs being shaped such that at each of two different intermediate positions of the valve member, said ribs partially shunt fluid away from one of said cavities via one of said shunting lines.

18. The valve assembly according to claim 1, further comprising:

a rotary motor drive, and a coupling disk for driving said valve member;

said base and valve member being enclosed in a hermetically-sealed housing;

said rotary motor drive being located externally of said housing and coupled to said valve member by permanent magnets carried on a driving disk located externally of said housing and coupled to the rotary motor drive, and on a driven disk located within said housing and coupled to the valve member.

19. The valve assembly according to claim 1, wherein said plurality of ports include a third port and a fourth port located on opposite sides of said high pressure port such that: in a first operational position of the valve member, said third port is connected to said low pressure port and said fourth port is connected to said high pressure port; and in a second operational position of the valve member, said third port is connected to said high pressure port, and said fourth port is connected to said low pressure port.

20. The valve assembly according to claim 19, in combination with:

a compressor having a high pressure side connected to said high pressure port, and a low pressure side connected to said low pressure port;

a first heat exchanger connected to said third port;

and a second heat exchanger connected to said fourth port;

such that in one operational position of the valve member, the valve member connects said first heat exchanger to said low pressure port, and said second heat exchanger to said high pressure port; and in an second operational position of the valve member, the valve member connects said first heat exchanger to said high pressure port and said second heat exchanger to said low pressure port.

21. An air-conditioning system for air-conditioning an enclosed space by compressing and expanding a fluid, comprising:

an inside heat exchanger to be located within the enclosed space;

an outside heat exchanger to be located outside the enclosed space;

a compressor having a low pressure side and a high pressure side;

and a change-over valve including:
  a base having a low pressure port connected to said low pressure side of the compressor, and a high pressure port connected to the high pressure side of the compressor;
  a valve member rotatable with respect to said base;
  a rotary motor drive for driving said valve member;
  and a controller for controlling said rotary motor drive to selectively drive said valve member;
  (a) to a first operational position connecting said low pressure port to said inside heat exchanger and said high pressure port to said outside heat exchanger to define a low pressure section including said inside heat exchanger for using the fluid to cool said enclosed space; and
  (b) to a second operational position connecting said high pressure port to said inside heat exchanger, and said low pressure port to said outside heat exchanger to define a high pressure section including said inside heat exchanger for using the fluid to heat said enclosed space;
  said controller controlling said rotary motor drive for selectively driving the valve member to at least one further position, in addition to said first and second operational positions;
  said valve member being constructed to maintain said high pressure section substantially isolated from said low pressure section and to perform at least one additional control function, when the valve member is driven to the further position.

22. The air-conditioning system according to claim 21, wherein said at least one additional function is to shunt a part of the fluid from said high pressure port to said low pressure port to thereby control temperature within the air-conditioning system without interrupting the operation of the compressor.

23. The air-conditioning system according to claim 21, wherein said at least one additional function is to restrict the effective cross-sectional area of said low pressure port with respect to the heat-exchanger connected thereto, to thereby control the output of the air-conditioning system without interrupting the operation of the compressor.

24. The air-conditioning system according to claim 21, wherein said base includes a shunting port connected to a shunting line; and wherein said at least one additional function is to shunt a part of the fluid via said shunting line from a high pressure location to a low pressure location in the air-conditioning system, to thereby control temperature within the air-conditioning system without interrupting the operation of the compressor.

25. The air-conditioning system according to claim 24, wherein said base includes two shunting lines connected to two shunting ports, and said valve member selectively connects one shunting line to said inside heat exchanger, and the other shunting line to said outside heat exchanger, according to the further position to which the valve member is driven by the controller.

26. The air-conditioning system according to claim 21, wherein said change-over valve further includes a pilot valve between said high pressure and low pressure ports; and said controller selectively opens and closes said pilot valve at any position of said valve member to control leakage from the high pressure port to said low pressure port for controlling temperature.

27. The air-conditioning system according to claim 21, wherein said valve member includes a control face facing said base to control the flow of fluid between said ports according to the position of the valve member with respect to the base, and an opposite face facing away from said base; said control face of the valve member being formed with a low pressure cavity in the central region thereof, and with an annular high pressure cavity in the outer region thereof completely circumscribing said low pressure cavity.

28. The air-conditioning system according to claim 27, further comprising:
  a slow-acting vent for applying high pressure from said high pressure cavity to said opposite face of the valve member, when the valve member is in an operational position, to firmly press the valve member into sealing contact with the base, and thereby to isolate the high pressure cavity from the low pressure cavity;
  a pilot valve which is normally closed but selectively openable to release the high pressure applied to said opposite face of the valve member, and thereby to enable the valve member to be moved to another operational position;
  and a passageway from said annular high pressure section of the valve member to said opposite face of the valve member to maintain said control face of the valve member sufficiently close to said base to substantially isolate the high pressure cavity from the low pressure cavity also when said pilot valve is open and said valve member is moved to another operational position or to a said further position intermediate said first and second operational positions.

29. The air-conditioning system according to claim 27, wherein said control face of the valve member is formed with a rib formation including inner and outer concentric closed-loop ribs defining said low pressure cavity within the inner closed-loop rib, and said high pressure cavity between the two closed-loop ribs.

30. The air-conditioning system according to claim 29, wherein said closed loop ribs are shaped such that, at least at one intermediate position of the valve member between said first and second operational positions, said ribs partially shunt fluid from said high pressure cavity to said low pressure cavity.

31. The air-conditioning system according to claim 29, wherein said closed-loop ribs are shaped such that, at least at one intermediate position of the valve member between said first and second operational positions, said ribs reduce the effective cross-sectional area of the low pressure port exposed to said low pressure cavity.

32. The air-conditioning system according to claim 29, further comprising:
  at least one shunting port, and a shunting line from said shunting port for partially shunting fluid away from one of said cavities; said closed-loop ribs being shaped such that, at one intermediate position of the valve member between said first and second operational positions, said ribs partially shunt fluid away from said one cavity.

33. The air-conditioning system according to claim 32, wherein there are a shunting port and a shunting line for each of said cavities, said closed loop ribs being shaped such that at each of two different intermediate positions of the valve member between said first and second operational positions, said ribs partially shunt fluid away from one of said cavities via one of said shunting lines.

34. The air-conditioning system according to claim 21, wherein said controller includes a temperature sensor for sensing the temperature at a predetermined location within the air-conditioning system and for controlling said rotary motor drive in response to the sensed temperature.

35. An air-conditioning system for air-conditioning an enclosed space by compressing and expanding a fluid, comprising:

an inside heat exchanger to be located within the enclosed space;

an outside heat exchanger to be located outside the enclosed space;

a compressor having a low pressure side and a high pressure side;

and a change-over valve including:
- a base having a low pressure port connected to said low pressure side of the compressor, a high pressure port connected to the high pressure side of the compressor, and at least one shunting port connected to a shunting line;
- a valve member rotatable with respect to said base;
- a rotary motor drive for driving said valve member;
- and a controller for controlling said rotary motor drive to selectively drive said valve member;
  - (a) to a first position connecting said low pressure ports to said inside heat exchanger, and said high pressure port to said outside heat exchanger, to define a low pressure section including said inside heat exchanger for using the fluid to cool said enclosed space;
  - (b) to a second position connecting said high pressure port to said inside heat exchanger and said low pressure port to said outside heat exchanger, to define a high pressure section including said inside heat exchanger for using the fluids to heat said enclosed space; and
  - (c) at least one further position connecting said shunting port to shunt a part of the fluid via said shunting line from a high pressure location to a low pressure location in the air-conditioning system to control temperature within the air-conditioning system without interrupting the operation of the compressor.

36. The air-conditioning system according to claim 35, wherein said change-over valve further includes a pilot valve between said high pressure and low pressure ports; and said controller selectively opens and closes said pilot valve at any position of said valve member to control leakage from the high pressure port to said low pressure port.

37. The air-conditioning system according to claim 35, wherein said valve member includes a control face facing said base to control the flow of fluid between said ports according to the position of the valve member with respect to the base, and an opposite face facing away from said base; said control face of the valve member being formed with a low pressure cavity in the central region thereof, and with an annular high pressure cavity in the outer region thereof completely circumscribing said low pressure cavity.

38. The air-conditioning system according to claim 37, further comprising:
- a slow-acting vent for applying high pressure from said high pressure cavity to said opposite face of the valve member, when the valve member is in an operational position, to firmly press the valve member into sealing contact with the base, and thereby to isolate the high pressure cavity from the low pressure cavity;
- a pilot valve which is normally closed but selectively openable to release the high pressure applied to said opposite face of the valve member, and thereby to enable the valve member to be moved to another operational position;
- and a passageway from said annular high pressure section of the valve member to said opposite face of the valve member to maintain said control face of the valve member sufficiently close to said base to substantially isolate the high pressure cavity from the low pressure cavity also when said pilot valve is open and said valve member is moved to another operational position or to said further position.

39. The air-conditioning system according to claim 37, wherein said control face of the valve member is formed with a rib formation including inner and outer concentric closed-loop ribs defining said low pressure cavity within the inner closed-loop rib, and said high pressure cavity between the two closed-loop ribs.

40. The air-conditioning system according to claim 39, wherein said closed-loop ribs are shaped such that, at least at one further position of the valve member intermediate its two operational positions, said ribs partially shunt fluid from said high pressure cavity to said low pressure cavity.

41. The air-conditioning system according to claim 39, wherein said closed-loop ribs are shaped such that, at least at one further position of the valve member intermediate its two operational positions, said ribs reduce the effective cross-sectional area of the low pressure port exposed to said low pressure cavity.

42. An air-conditioning system for air-conditioning an enclosed space by compressing and expanding a fluid, comprising:

an inside heat exchanger to be located within the enclosed space;

an outside heat exchanger to be located outside the enclosed space;

a compressor having a low pressure side and a high pressure side;

and a change-over valve including:
- a base having a low pressure port connected to said low pressure side of the compressor, and a high pressure port connected to the high pressure side of the compressor;
- a valve member rotatable with respect to said base;
- a pilot valve connecting the high pressure port to the low pressure port of the change-over valve;
- a rotary motor drive for driving said valve member;
- and a controller for controlling said rotary motor drive to selectively drive said valve member;
- said controllable also controlling said pilot valve to selectively open or close it in any position of the valve member to produce a controlled leakage from said high pressure side to said low pressure side of the compressor.

43. The air-conditioning system according to claim 42, wherein said rotary motor drive drives said valve member via a coupling disk which is directly coupled to the rotary motor drive and is coupled to the valve member via a lost-motion coupling such that the coupling disk may be rotated a small amount to open or close the pilot valve without rotating the valve member.

44. The air-conditioning system according to claim 43, wherein said coupling disk includes a spring-biased pin receivable within a recess in the valve member to releasably retain the coupling disk in a normal position closing said pilot valve, but rotatable by said rotary motor drive with respect to said valve member to open or close said pilot valve in any position of the valve member.

45. The air-conditioning system according to claim 43, wherein said coupling disk includes a pair of diametrically opposed spring-biased pins receivable within diametrically-opposed recesses in the valve member to retain the coupling disk in a normal position with respect to said pilot valve.

46. The air-conditioning system according to claim 43, wherein said lost-motion coupling between said coupling disk and said valve member comprises a projection carried by said coupling disk movable within a slot in said valve member.

47. A method of air conditioning an enclosed space, comprising: providing an air conditioning system according to claim 21, and selectively actuating said valve assembly;
   (a) to said first operational position to effect a cooling mode of operation;
   (b) to said second operational position to effect a heating mode of operation;
   or (c) to said at least one further position, to produce a control of the air-conditioning system in the respective mode of operation without interrupting the operation of the air-conditioning system.

48. The method according to claim 47, wherein said valve assembly is actuated to said further position to produce a controlled leakage between said high pressure port to said low pressure port to prevent frosting without interrupting the operation of the air-conditioning system.

49. The method according to claim 48, wherein the ambient temperature is sensed by a temperature sensor, and the output of said temperature sensor is used to automatically control the valve assembly to prevent frosting by actuating the valve from one operational position to said further position.

50. The method according to claim 47, wherein said valve assembly is actuated to said further position to produce a controlled reduction in the cross-sectional area of said low pressure port in the base to reduce the output of the air-conditioning system without interrupting its operation.

51. The method according to claim 47, wherein said change-over valve includes a pilot valve, and said controller selectively opens or closes said pilot valve at any one of said operational or further positions to produce a controlled leakage from the high pressure side to the low pressure side of the compressor for temperature control purposes.

52. The method according to claim 47, wherein said base includes a shunting port connected to a shunting line, and said rotary motor drive is controlled to selectively connect said shunting line to shunt a part of the fluid via said shunting port from a high pressure location to a low pressure location in the air-conditioning system to control temperature within the air-conditioning system without interrupting the operation of the compressor.

* * * * *